United States Patent
Abdallah et al.

(10) Patent No.: US 10,887,752 B2
(45) Date of Patent: *Jan. 5, 2021

(54) DISCOVERY OF NEIGHBOR NODES IN WIRELESS MESH NETWORKS WITH DIRECTIONAL TRANSMISSIONS

(71) Applicant: SONY CORPORATION, Tokyo (JP)

(72) Inventors: Ramy Medhat Abdallah, San Jose, CA (US); Mohamed Abouelseoud, San Francisco, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/718,610

(22) Filed: Dec. 18, 2019

(65) Prior Publication Data
US 2020/0128386 A1    Apr. 23, 2020

Related U.S. Application Data

(63) Continuation of application No. 16/030,495, filed on Jul. 9, 2018, now Pat. No. 10,542,412, which is a
(Continued)

(51) Int. Cl.
*H04W 8/00* (2009.01)
*H04B 7/08* (2006.01)
(Continued)

(52) U.S. Cl.
CPC .......... *H04W 8/005* (2013.01); *H04B 7/0617* (2013.01); *H04B 7/0632* (2013.01); *H04B 7/0686* (2013.01); *H04B 7/0695* (2013.01); *H04B 7/086* (2013.01); *H04B 7/088* (2013.01); *H04L 45/24* (2013.01); *H04W 40/28* (2013.01); *H04W 84/18* (2013.01)

(58) Field of Classification Search
CPC .. H04B 7/0617; H04B 7/0632; H04B 7/0686; H04B 7/0695; H04B 7/086; H04B 7/088; H04L 45/24; H04W 40/28; H04W 84/18; H04W 8/005
USPC ...... 455/67.11, 67.16, 63, 436, 575.7, 562.1, 455/121, 269, 274; 370/336, 328, 338, 370/329
See application file for complete search history.

(56) References Cited

U.S. PATENT DOCUMENTS 8,422,961 B2   4/2013   Kafle
9,474,009 B2   10/2016  Deenoo
(Continued)

OTHER PUBLICATIONS

Kirthiga, S. et al., "Performance Studies and Review of Millimeter Wave MIMO Beamforming at 60 GHz", Procedia Technology 21 (2015) 658-666, Smart Grid Technologies, Aug. 6-8, 2015.
(Continued)

*Primary Examiner* — Tan H Trinh
(74) *Attorney, Agent, or Firm* — O'Banion & Ritchey LLP; John P. O'Banion

(57) ABSTRACT

Wireless mesh networking protocols for directional transmissions in the PHY layer over multiple hops between a mix of mesh and non-mesh stations (STAs). Joint beamforming (BF) training and mesh network discovery is described including adaptive signaling with the mesh network. The mesh networking protocol can be utilized in a mix of wireless nodes including portals, access points (APs), personal control points (PCPs), and mesh stations (STAs).

20 Claims, 22 Drawing Sheets

Related U.S. Application Data continuation of application No. 15/637,536, filed on Jun. 29, 2017, now Pat. No. 10,045,197.

(51) Int. Cl.
| | | |
|---|---|---|
| *H04B 7/06* | (2006.01) | |
| *H04W 40/28* | (2009.01) | |
| *H04L 12/707* | (2013.01) | |
| *H04W 84/18* | (2009.01) | |

(56) References Cited

U.S. PATENT DOCUMENTS

| | | | |
|---|---|---|---|
| 9,497,651 B2 | 11/2016 | Niu | |
| 10,045,197 B1* | 8/2018 | Abdallah | H04L 45/24 |
| 10,116,367 B1 | 10/2018 | Sakoda | |
| 10,542,412 B2* | 1/2020 | Abdallah | H04B 7/086 |
| 2006/0142034 A1 | 6/2006 | Wentink | |
| 2010/0214169 A1 | 8/2010 | Kafle | |
| 2010/0265924 A1 | 10/2010 | Yong | |
| 2011/0103264 A1 | 5/2011 | Wentink | |
| 2011/0205969 A1 | 8/2011 | Ahmad | |
| 2012/0106474 A1 | 5/2012 | Wu | |
| 2013/0083865 A1 | 4/2013 | Wu | |
| 2014/0141826 A1 | 5/2014 | Cordeiro | |
| 2015/0071185 A1 | 3/2015 | Trainin | |
| 2015/0382171 A1 | 12/2015 | Roy | |
| 2015/0382268 A1* | 12/2015 | Hampel | H04W 36/24 |
| | | | 455/436 |
| 2016/0044711 A1 | 2/2016 | Lou | |
| 2016/0119043 A1 | 4/2016 | Rajagopal | |
| 2016/0174206 A1 | 6/2016 | Xia | |
| 2016/0285583 A1* | 9/2016 | Kasher | H04B 7/088 |
| 2017/0079031 A1 | 3/2017 | Maltsev, Jr. | |
| 2017/0086211 A1 | 3/2017 | Sahin | |
| 2017/0111099 A1 | 4/2017 | Jo | |
| 2017/0134076 A1 | 5/2017 | Maamari | |
| 2017/0352954 A1* | 12/2017 | Abdallah | H04B 7/0695 |
| 2018/0020389 A1* | 1/2018 | Abdallah | H04W 40/246 |
| 2018/0026700 A1 | 1/2018 | Andonieh | |
| 2018/0191415 A1 | 7/2018 | Aryafar | |
| 2018/0206268 A1 | 7/2018 | Abdallah | |
| 2018/0262366 A1 | 9/2018 | Sahin | |
| 2019/0053133 A1* | 2/2019 | Abouelseoud | H04W 48/16 |
| 2019/0082379 A1 | 3/2019 | Abouelseoud | |
| 2019/0182685 A1* | 6/2019 | Abouelseoud | H04W 24/02 |

OTHER PUBLICATIONS

ISA/EPO, European Patent Office, International Search Report and Written Opinion dated Sep. 4, 2018, related PCT international application No. PCT/IB2018/053986, pp. 1-18, claims searched, pp. 19-24.

* cited by examiner

| Element ID | Length | Active Path Selection Protocol Identifier | Active Path Selection Metric Identifier | Congestion Control Mode Identifier | Synchronization Method Identifier | Authentication Protocol Identifier | Mesh Formation Info | Mesh Capability |
|---|---|---|---|---|---|---|---|---|
| 1 | 1 | 1 | 1 | 1 | 1 | 1 | 1 | 1 |

Octets:

FIG. 5
(Prior Art)

| Frame control | Duration | RA | TA | SSW | SSW Feedback | FCS |
|---|---|---|---|---|---|---|

Octets: 2    2    6    6    3    3    4

| Direction | CDOWN | Sector ID | DMG Antenna ID | RXSS Length |
|---|---|---|---|---|

Bits: 1    9    6    2    6

| Total sectors in ISS | Number of RX DMG antennas | Reserved | Poll Required | Reserved |
|---|---|---|---|---|

Bits: 9    2    5    1    7

| Sector select | DMG Antenna select | SNR report | Poll Required | Reserved |
|---|---|---|---|---|

Bits: 6    2    8    1    7

| Rx Start | Rx Duration | MSSW | MSSW-FB | Mesh ID | Mesh Configuration |

180 ↘

| Direction | Groups | Group ID | CDOWN | Sector ID | DMG Antenna ID | RXSS Length |

190 ↘

| Group ID | SSW-FB |

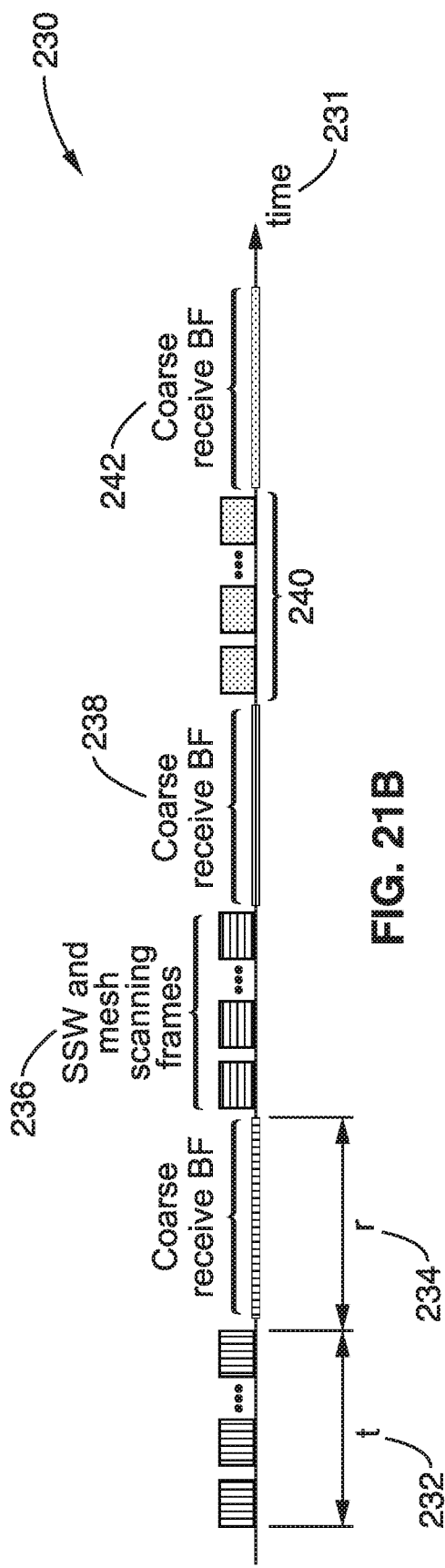
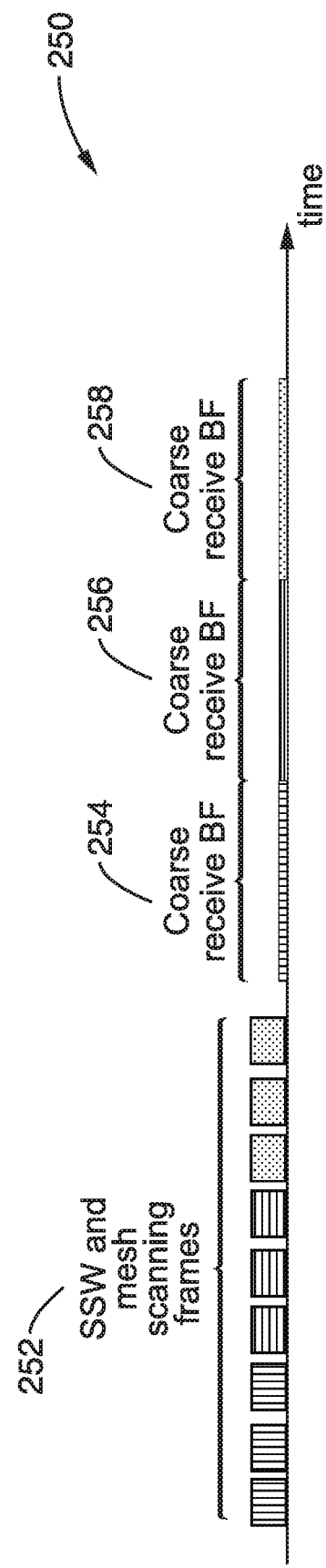
FIG. 21B
FIG. 22

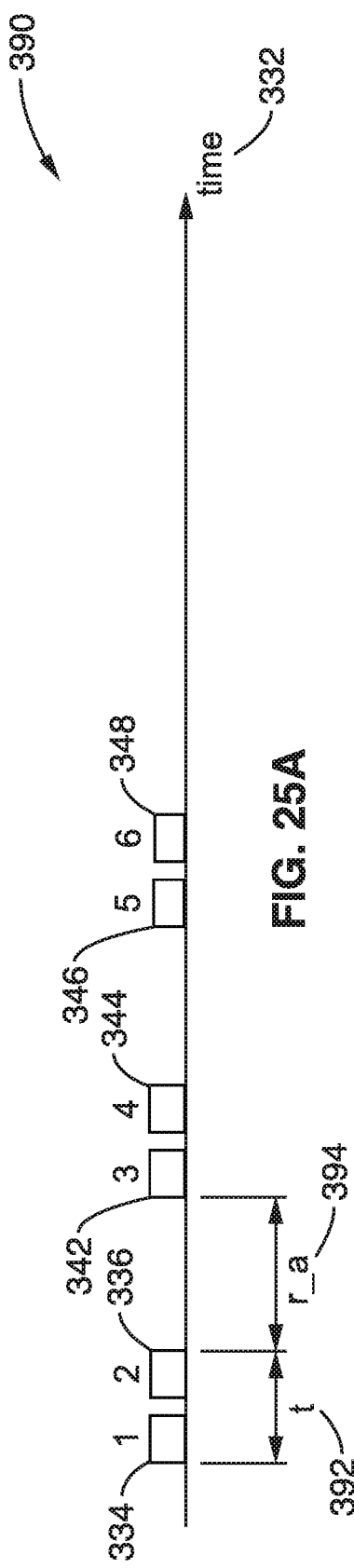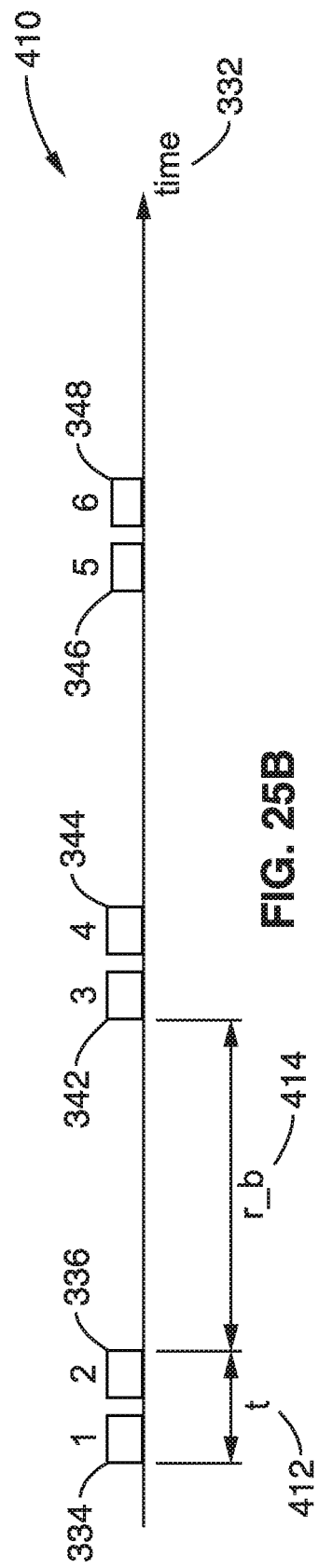

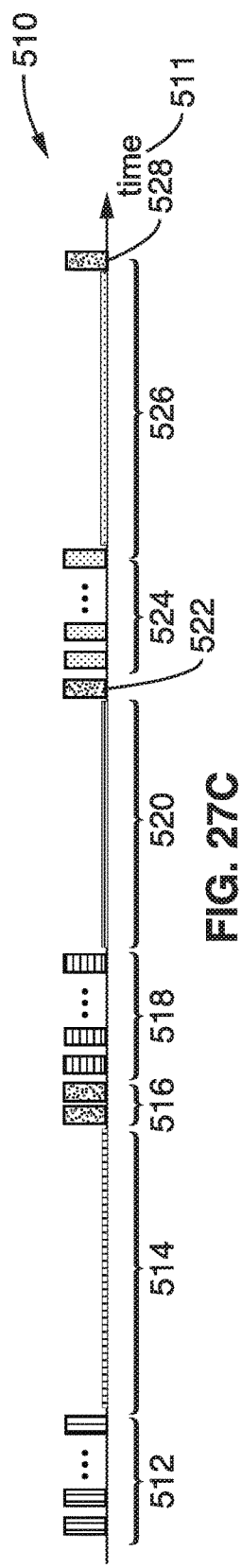
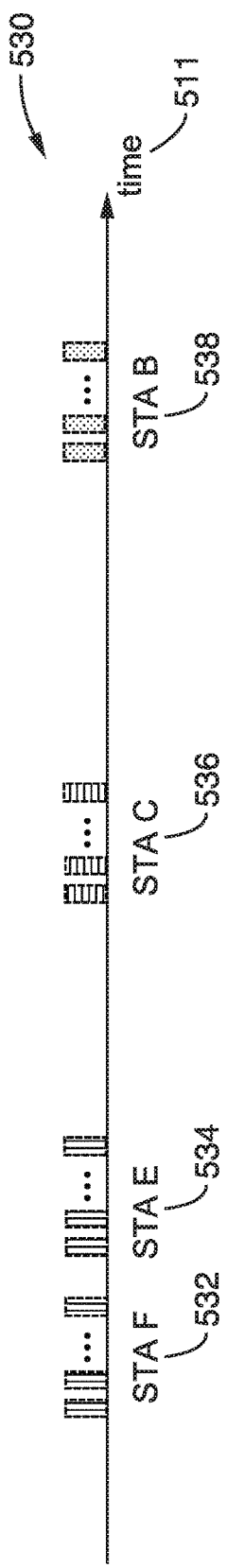
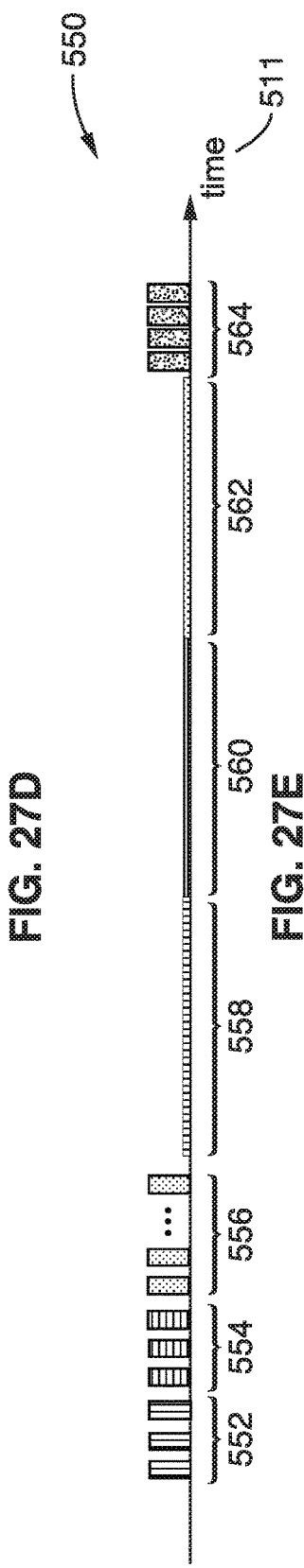
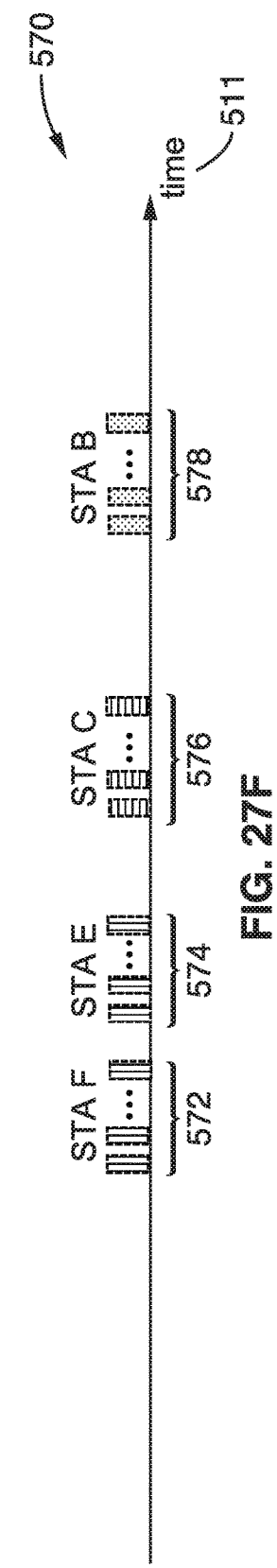
FIG. 27C
FIG. 27D
FIG. 27E
FIG. 27F

DISCOVERY OF NEIGHBOR NODES IN WIRELESS MESH NETWORKS WITH DIRECTIONAL TRANSMISSIONS

CROSS-REFERENCE TO RELATED APPLICATIONS

This application is a continuation of U.S. patent application Ser. No. 16/030,495 filed on Jul. 9, 2018, incorporated herein by reference in its entirety, which is a continuation of U.S. patent application Ser. No. 15/637,536 filed on Jun. 29, 2017, now U.S. Pat. No. 10,045,197, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to directional wireless communications between stations, and more particularly to multiple-hop relayed directional wireless communication which can mix mesh and non-mesh stations.

2. Background Discussion

Wireless networks, including mesh networks and mixtures of mesh and non-mesh networks, are becoming increasingly important, such as in the millimeter wave (mm-wave) frequencies. With directional stations configured for beamforming, it is possible to mitigate interference to other neighbor STAs. Theoretically, this leads to higher system capacity as the spectrum can be reused by neighboring STAs more aggressively.

However, a daunting task in mesh networking is the process of neighbor discovery; a task whose complexity increases when directional transmission is introduced. The challenges in this process include: (a) knowledge of surrounding nodes IDs, (b) knowledge of best transmission patterns for beamforming; (c) channel access issues due to communication collisions and deafness; and (d) channel impairments due to blockage and reflections.

Providing neighborhood discovery mechanisms which overcome some or all of the above shortcomings for existing techniques is important for opening a path to pervasive mmWave device-to-device (D2D) and mesh technologies. Existing technologies for mesh networking only address mesh discovery solutions for networks operating in broadcast mode and are not designed, or capable for beneficial use, on networks using directional wireless communications.

Accordingly, a need exists for mesh discovery solutions which are practical for mm-wave directional wireless networks. The present disclosure fulfills that need, as well as others, while providing additional benefits over existing direction wireless protocols.

BRIEF SUMMARY

An efficient multiple-hop (multi-hop) communication network protocol is disclosed for directional transmission in the PHY layer (i.e., mm-wave PHY), and referred to herein as a mm-wave mesh network. Adding multi-hop relay capability is a promising technology mix toward overcoming some of the drawbacks of mm-wave PHY.

The present disclosure teaches new methods for performing joint beamform (BF) training and mesh network neighbor discovery, which include adaptive signaling within the mesh network.

A number of terms are utilized in the disclosure whose meanings are generally utilized as described below.

Mesh Access Point (Mesh AP): a Mesh STA who has an attached access point (AP) to provide services for clients (STA).

Mesh Identification (Mesh ID): an identification element of the mesh network.

Mesh profile: a set of parameters that specifies the attributes of a mesh basic service set (BSS).

Mesh Station (Mesh STA): a node that participates in the formation and operation of the mesh cloud.

MIMO: Multiple Input Multiple Output; communications between two devices with multiple streams of data.

Portal: a mesh STA with the additional functionality of acting as a bridge or gateway between the mesh cloud and external networks.

PCP Station: personal control point Station.

Quasi-omni directional: A directional multi-gigabit (DMG) antenna operating mode with the widest beamwidth attainable.

RREQ: Routing Request, a packet used in data routing protocols to discover the path between the source STA and the destination STA.

RREP: Routing Reply, a packet transmitted in response to RREQ in routing protocols, whereupon reception of RREP by a source STA it can start transmitting data packets.

SISO: Single Input Single Output; communications between two devices with single stream of data.

SSID: service Set Identifier; the name assigned to a WLAN network.

SSW: Sector Sweep, is an operation in which transmissions are performed in different sectors (directions) and information collected on received signals, strengths and so forth.

STA: Station; a logical entity that is a singly addressable instance of a medium access control (MAC) and physical layer (PHY) interface to the wireless medium (WM).

Sweep: A sequence of transmissions, separated by a short beamforming interframe space (SBIFS) interval, in which the antenna configuration at the transmitter or receiver is changed between transmissions.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 5 is a data field diagram of a Mesh Configuration element in the existing IEEE 802.11s protocol.

FIG. 8 is a data field diagram of a sector sweep frame (an SSW frame) as utilized in the 802.11ad standard.

FIG. 9 is a data field diagram of the sector sweep field within an SSW frame as utilized in the 802.11ad standard.

FIG. 10A and FIG. 10B are data field diagrams of different SSW feedback fields.

Figures 18, 19, 20, 21A:
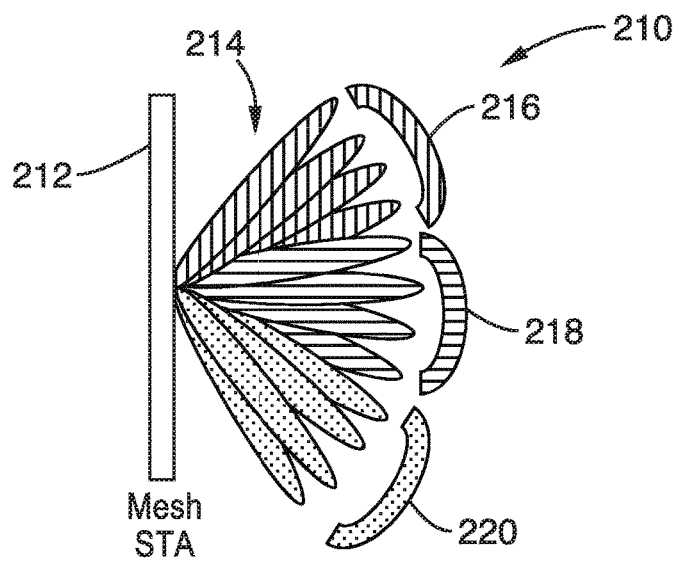
FIG. 18 is a data field diagram of an MSSW Control frame according to an embodiment of the present disclosure.
FIG. 19 is a data field diagram of the MSSW IE field of the MSSW control frame according to an embodiment of the present disclosure.

FIG. 20 a data field diagram is MSSW-FB IE field according to an embodiment of the present disclosure.

FIG. 21A and FIG. 21B are block diagrams of sector sweeping and responses according to an embodiment of the present disclosure.

FIG. 22 is a communication timeline of one shot SSW transmission and RX BF according to an embodiment of the present disclosure.

Figure 23:
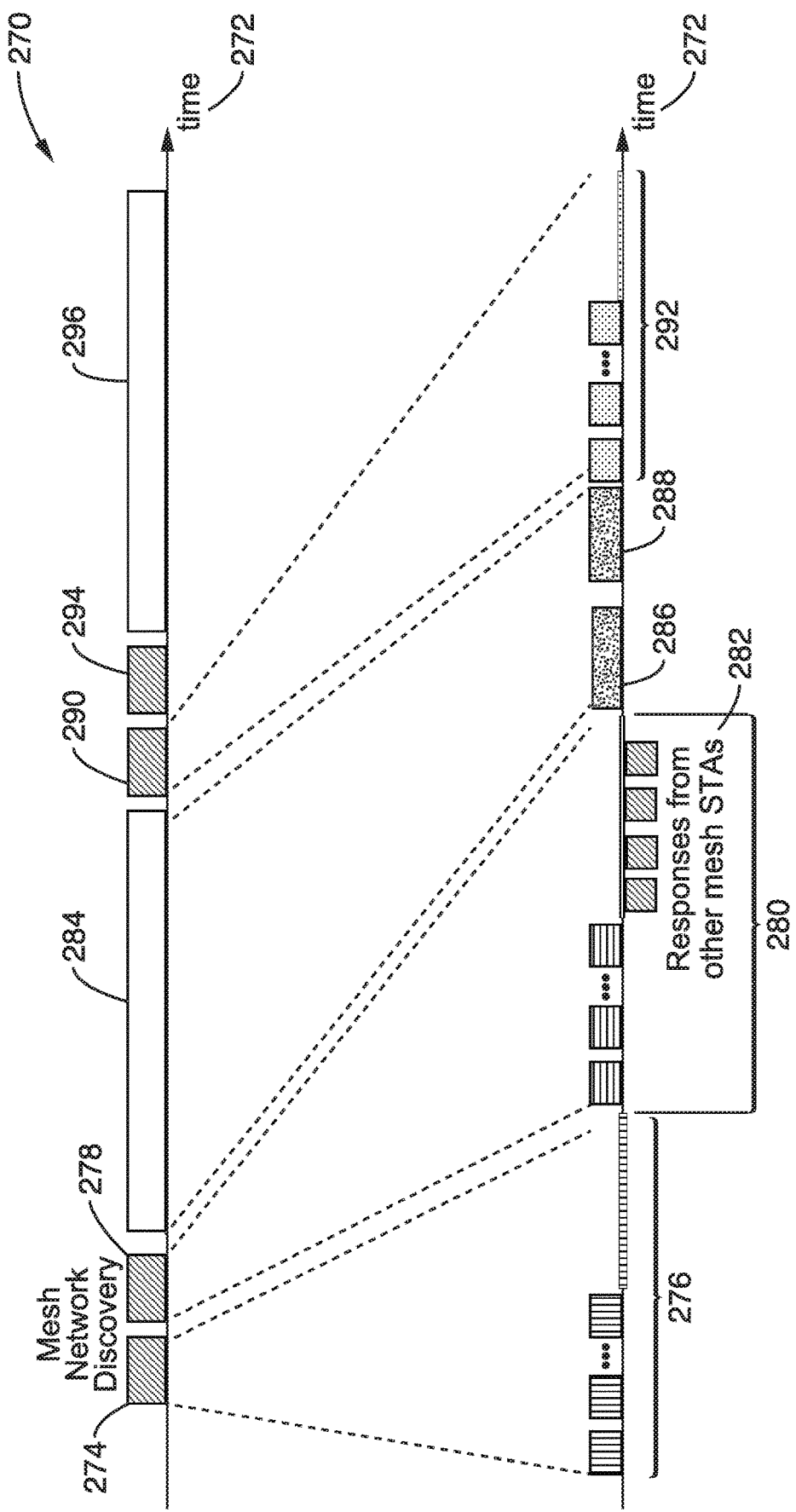

FIG. 23 is a transmit-response diagram of freezing BF training and mesh discovery according to an embodiment of the present disclosure.

Figure 24A:
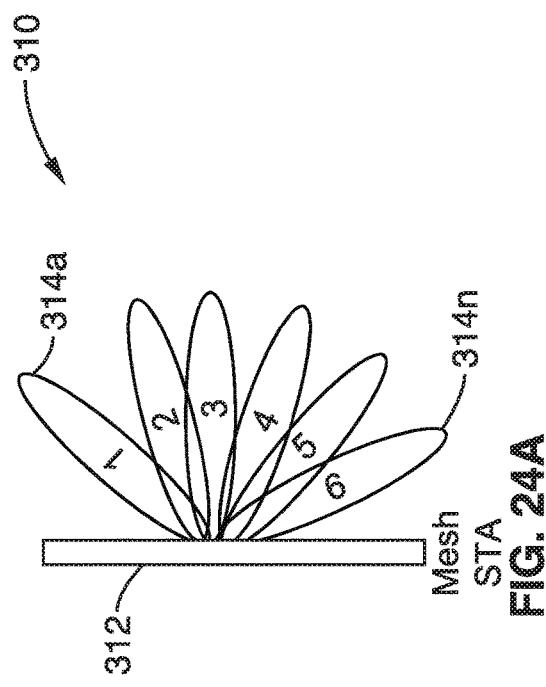
Figure 24B:
Figure 24C:
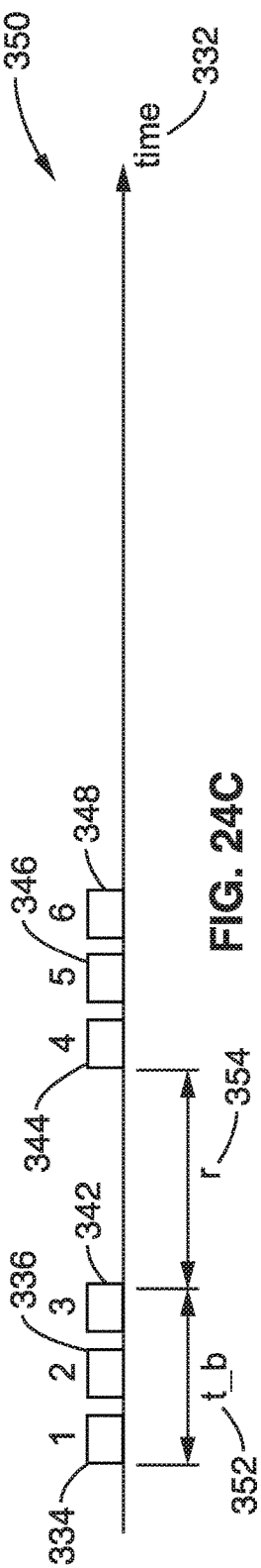

FIG. 24A through FIG. 24C are block diagrams and message passing diagram of allocating flexible transmission times according to an embodiment of the present disclosure.

FIG. 25A and FIG. 25B are message passing diagram for an alternate method of allocating flexible reception times according to an embodiment of the present disclosure.

Figure 26A:
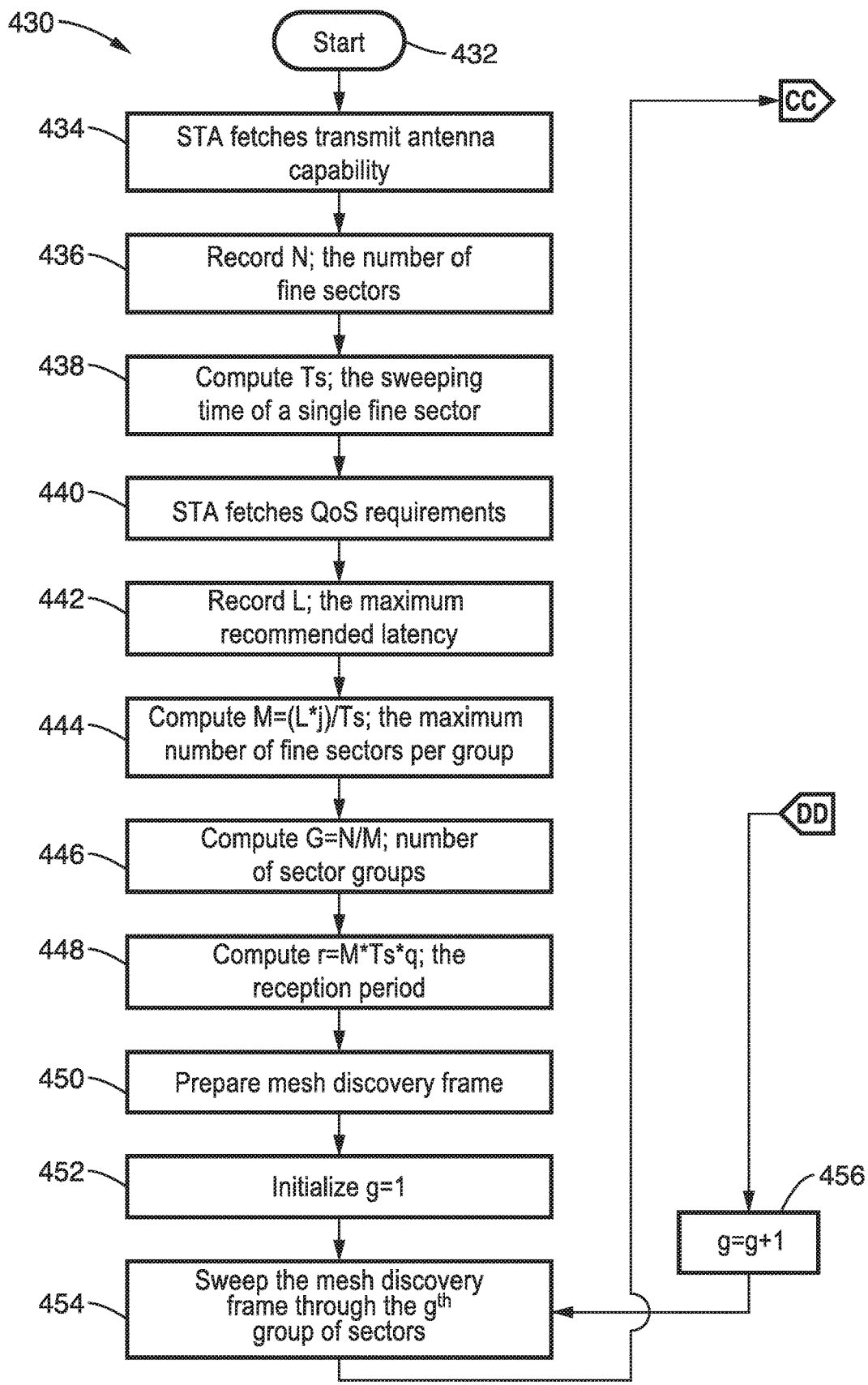
Figure 26B:
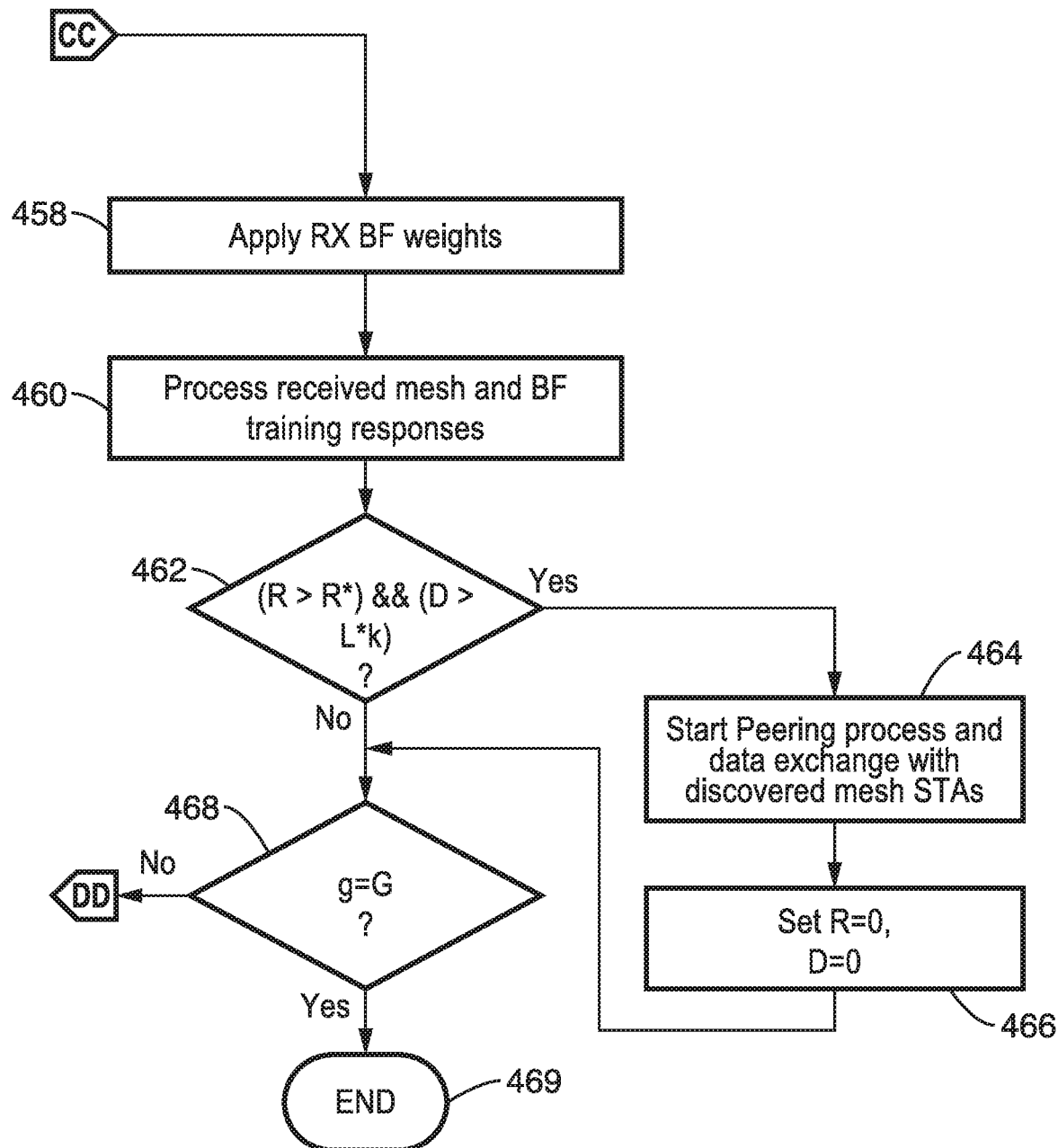

FIG. 26A and FIG. 26B is a flow diagram of adapting mesh discovery signaling according to an embodiment of the present disclosure.

FIG. 27A through FIG. 27F are diagrams of mesh discovery protocol according to an embodiment of the present disclosure.

Figure 28:
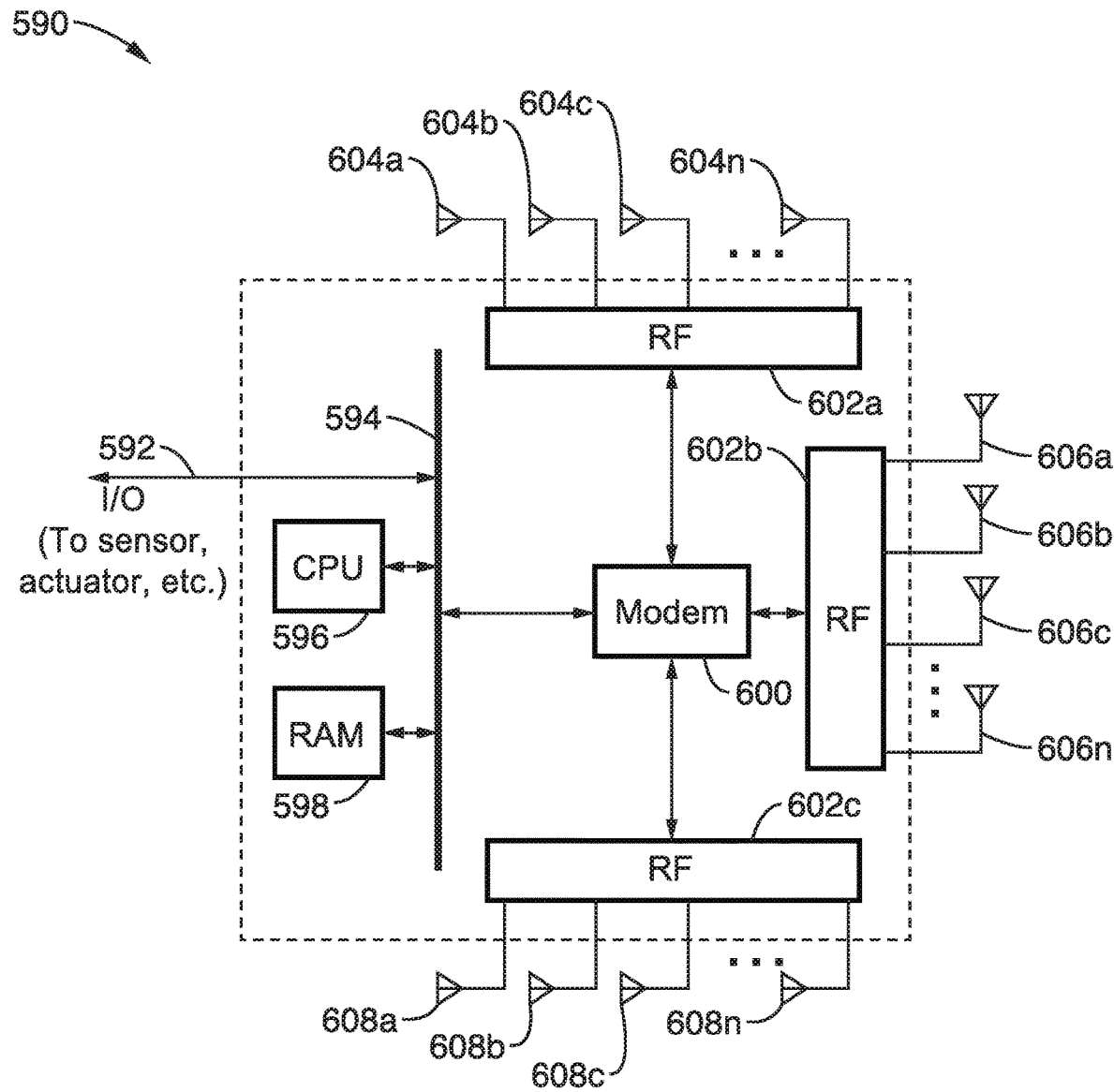

FIG. 28 is a block diagram of station hardware as utilized according to an embodiment of the present disclosure.

Figure 29:
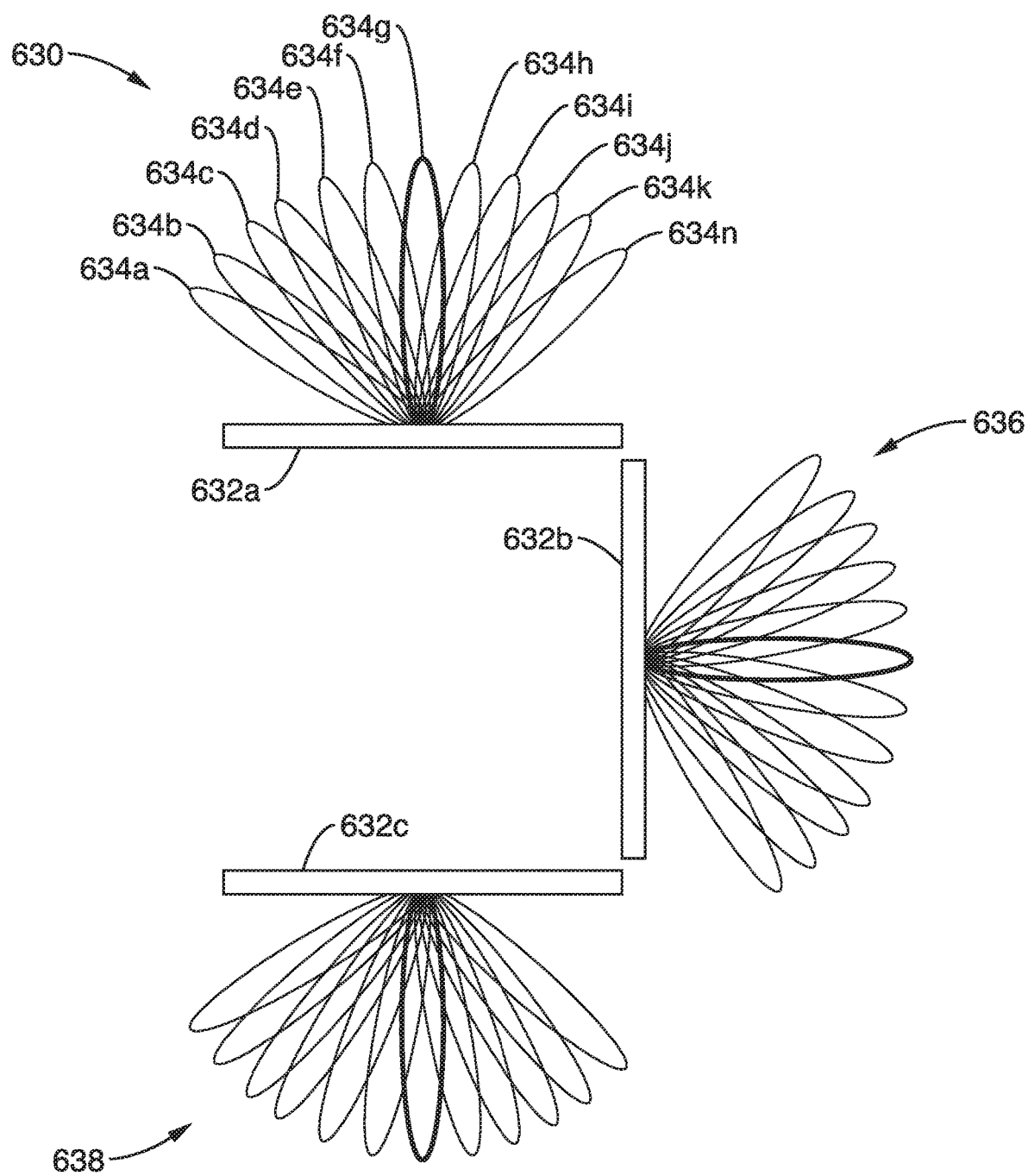

FIG. 29 is a beam pattern diagram as utilized on STAs according to an embodiment of the present disclosure.

DETAILED DESCRIPTION

1. Introduction to IEEE 802.11s

IEEE 802.11s is a wireless communications standard that adds wireless mesh networking capabilities to the IEEE 802.11 standard. In 802.11s new types of radio stations as well as new signaling is provided to enable mesh network discovery, establishing peer-to-peer connection, and routing of data through the mesh network.

Figure 1:
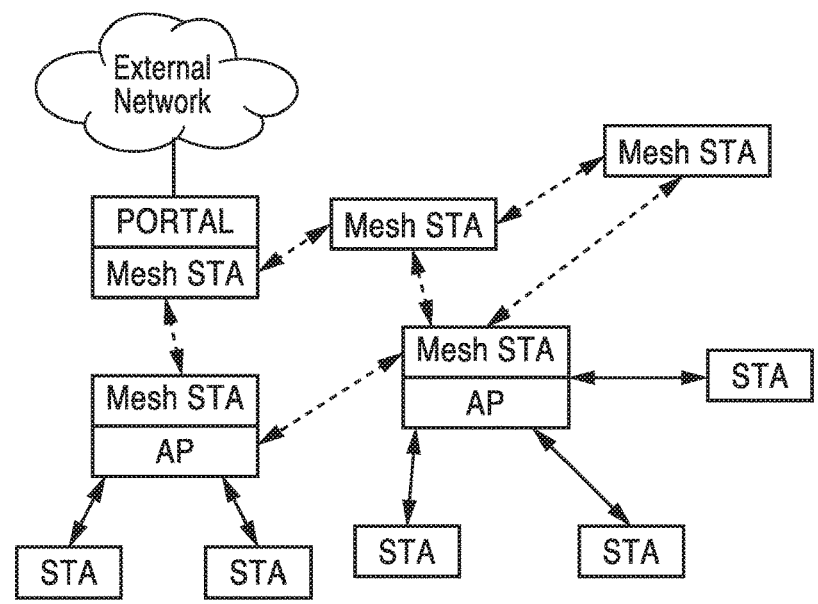
FIG. 1 is a radio node topology showing a mix of stations, access points, and portals as shown for a mixed network of mesh and non-mesh stations.

FIG. 1 illustrates one example of a mesh network where a mix of non-mesh STAs connect to Mesh-STA/AP (solid lines) and Mesh STAs connect to other mesh STAs (dotted lines) including a mesh portal according to IEEE 802.1a Multihop MAC.

The first step in mesh network formation is to discover the neighbors. The 802.11s protocol utilizes active or passive scanning signals that include mesh related fields. Passive scanning is performed through periodic beacon signals. Active scanning is performed through on-demand probe request signals.

Each mesh STA transmits Beacon frames periodically, and responds with Probe Response frames when a Probe Request frame is received, so that neighbor mesh STAs can perform mesh discovery appropriately. The identification of the mesh network is given by the Mesh ID element contained in the Beacon and the Probe Response frames. In one mesh network, all mesh STAs use the same mesh profile. Mesh profiles are considered the same if all parameters in the mesh profiles match. The mesh profile is included in the Beacon and Probe Response frames, so that the mesh profile can be obtained by its neighbor mesh STAs through the scan. When a mesh STA discovers a neighbor mesh STA through the scanning process, the discovered mesh STA is considered a candidate peer mesh STA. It may become a member of the mesh network of which the discovered mesh STA is a member and establish a mesh peering with the neighbor mesh STA. The discovered neighbor mesh STA may be considered a candidate peer mesh STA when the mesh STA uses the same mesh profile as the received Beacon or Probe Response frame indicates for the neighbor mesh STA.

The mesh STA attempts to maintain the discovered neighbors information in a Mesh Neighbors Table, which includes (a) a neighbor MAC address, (b) operating channel number, and (c) most recently observed link status and quality information. If no neighbors are detected, the mesh STA adopts the Mesh ID for its highest priority profile and remains active.

All the described signaling to discover neighbor mesh STAs are currently performed in broadcast mode, because the 802.11s protocol was not designed for networks with directional wireless communications.

Figure 2:
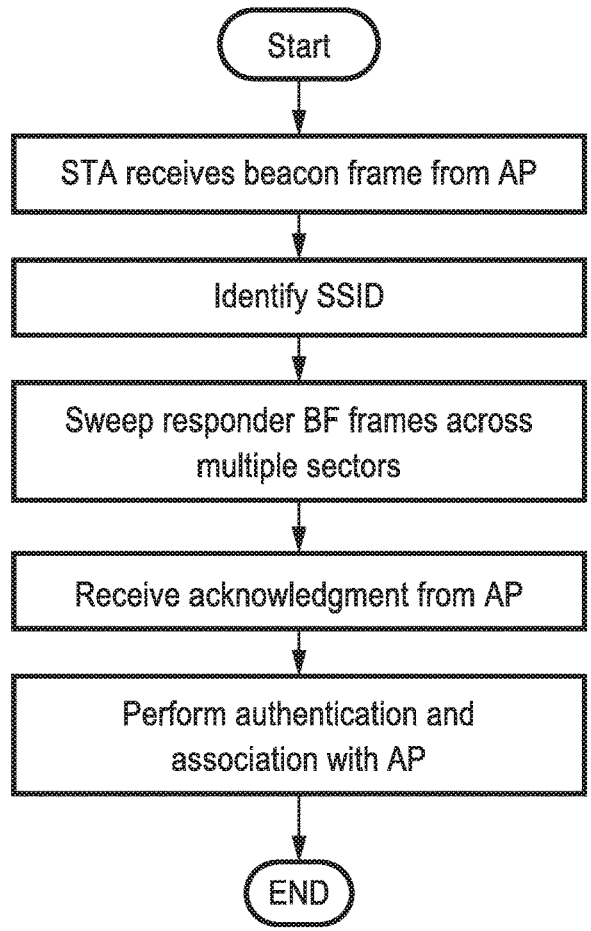
FIG. 2 is a flow diagram for a STA joining a regular IEEE802.11 WLAN.
Figures 3, 4:
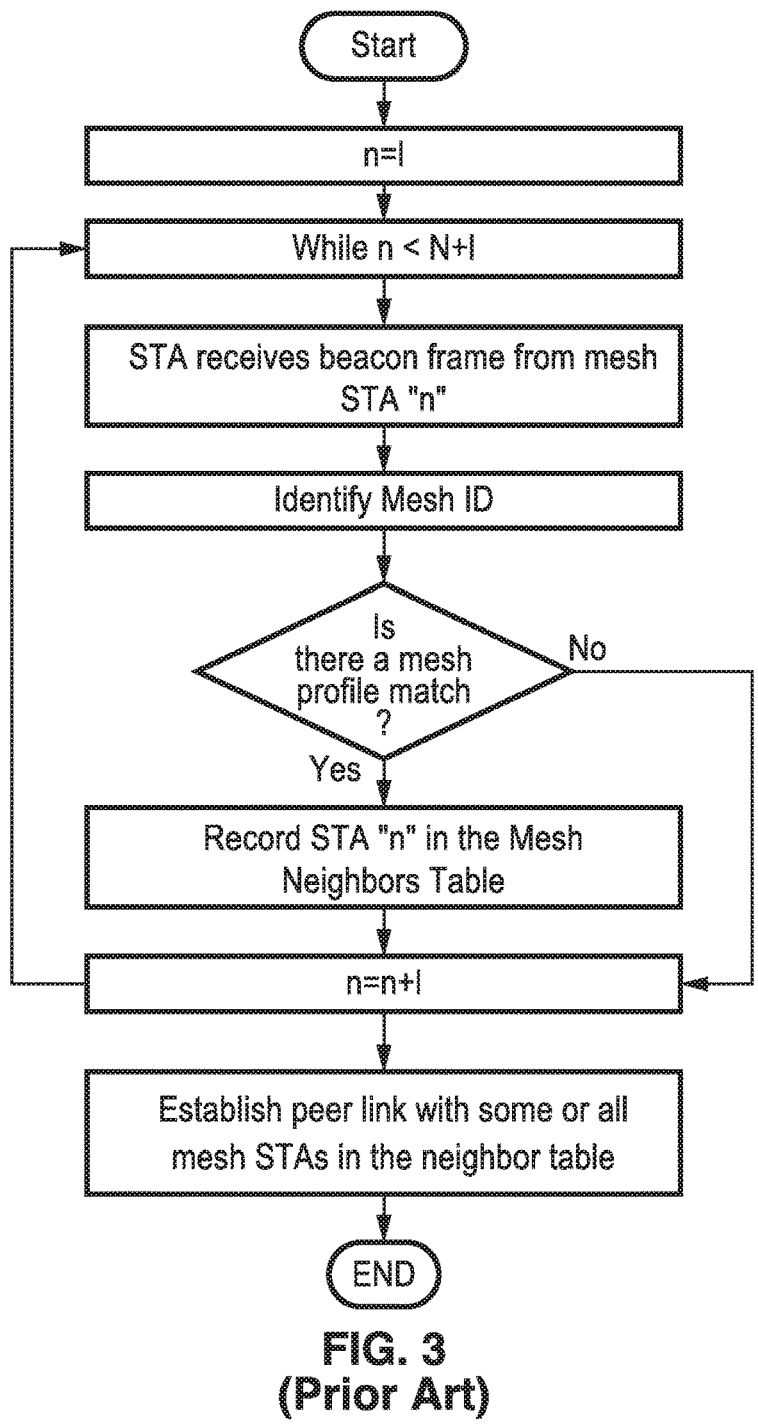
FIG. 3 is a flow diagram for a STA joining a IEEE802.11 mesh WLAN.
FIG. 4 is a data field diagram of a mesh ID element in the existing IEEE 802.11s protocol.

FIG. 2 and FIG. 3 illustrate the difference between a STA joining a regular WLAN network versus joining a WLAN mesh network. In FIG. 2 a STA passively listens to beacons from nearby access points, receives a beacon that contains the SSID of the 60 GHZ 802.11 network, e.g., 802.11ad. The STA completes BF training with the AP and after receiving BF training completion acknowledgment from the AP, it can start authentication and association with that AP. A different process is performed for mesh networks, with FIG. 3 depicting the flow of a new STA joining a WLAN mesh network, e.g., 802.11s. A new mesh STA waits to listen to multiple beacons from different "N" mesh STAs. The Mesh ID allows the STA to recognize the mesh nodes belonging to the same network. After the discovery of few mesh STAs, the new mesh STA would start establishing peer links with some or all of its recorded Mesh Neighbors Table.

1.1. Mesh Identification Element in IEEE 802.11s

FIG. 4 depicts a Mesh ID element used in IEEE 802.11s to advertise the identification of a mesh network, and showing fields of Element ID, Length, and Mesh ID. The Mesh ID (Mesh ID) is transmitted in a Probe request, by a new STA willing to join a mesh network, and in beacon signals, by existing mesh network STAs. Setting a Mesh ID field to a 0 length indicates the wildcard Mesh ID as used within Probe Request frame. A wildcard Mesh ID is a specific ID that prevents non-mesh STA from joining a mesh network.

1.2. Mesh Configuration Element in IEEE 802.11s

FIG. 5 depicts a Mesh Configuration element of IEEE 802.11s, as utilized for advertising mesh services. The Mesh Configuration element is contained in Beacon frames and Probe Response frames transmitted by mesh STAs. Aside from an Element ID, Length, Mesh Formation Info and Mesh Capability, the main contents of the Mesh Configuration elements are: a path selection protocol identifier, a path selection metric identifier, a congestion control mode identifier, synchronization method identifier, and an authentication protocol identifier. The contents of the Mesh Configuration Element seen in FIG. 3 together with the Mesh ID form a mesh profile.

2. Overview of 802.11ad Beamform (BF) Training

An example of a mmWave WLAN state-of-the-art system is found in the IEEE 802.11ad standard. BF training is a bidirectional sequence of BF training frame transmissions that utilize sector sweep and provide the necessary signaling to allow each STA to determine appropriate antenna system settings for both transmission and reception. The 802.11ad BF training process can be performed in phases. Sector level sweep phase is performed in which directional transmission with low gain (quasi-omni) reception is performed for link acquisition. A refinement phase then adds receive gain and final adjustment for combined transmit and receive. A tracking phase is performed during data transmission to adjust for channel changes.

2.1. 802.11ad SLS BF Training

The following focuses on the sector level sweep (SLS) mandatory phase of the 802.11ad standard. During SLS, a pair of STAs exchange a series of sector sweep (SSW) frames (or beacons in case of transmit sector training at the personal control point (PCP) station or access point (AP) station (PCP/AP) over different antenna sectors to find the one providing highest signal quality. The station that transmits first is called the initiator, the second is the responder. During a transmit sector sweep (TXSS), SSW frames are transmitted on different sectors while the pairing node (the responder) receives with a quasi-omni directional pattern. The responder determines the antenna array sector from the initiator which provided the best link quality (e.g., SNR).

Figure 6:
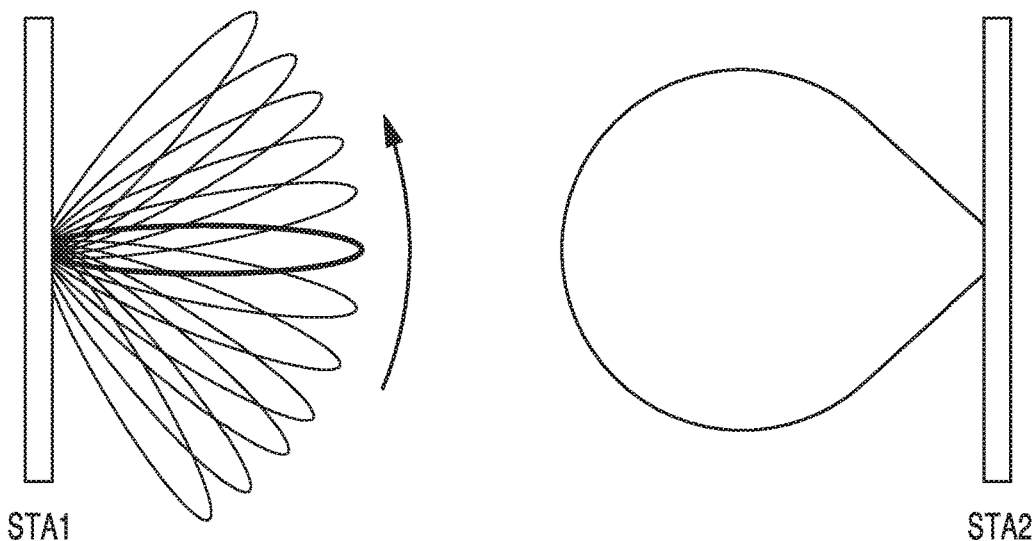
FIG. 6 is a block diagram of sector sweep for a directional transmitter having a plurality of sectors and an quasi-omni directional receiver station.

FIG. 6 illustrates the concept of SSW in 802.11ad with an example in which STA1 is an initiator of the SLS and STA2 is the responder. STA1 sweeps through all of the transmit antenna pattern fine sectors while STA2 receives in a quasi-omni directional pattern. STA2 feeds back to STA1 the best sector it received from STA1.

Figure 7:
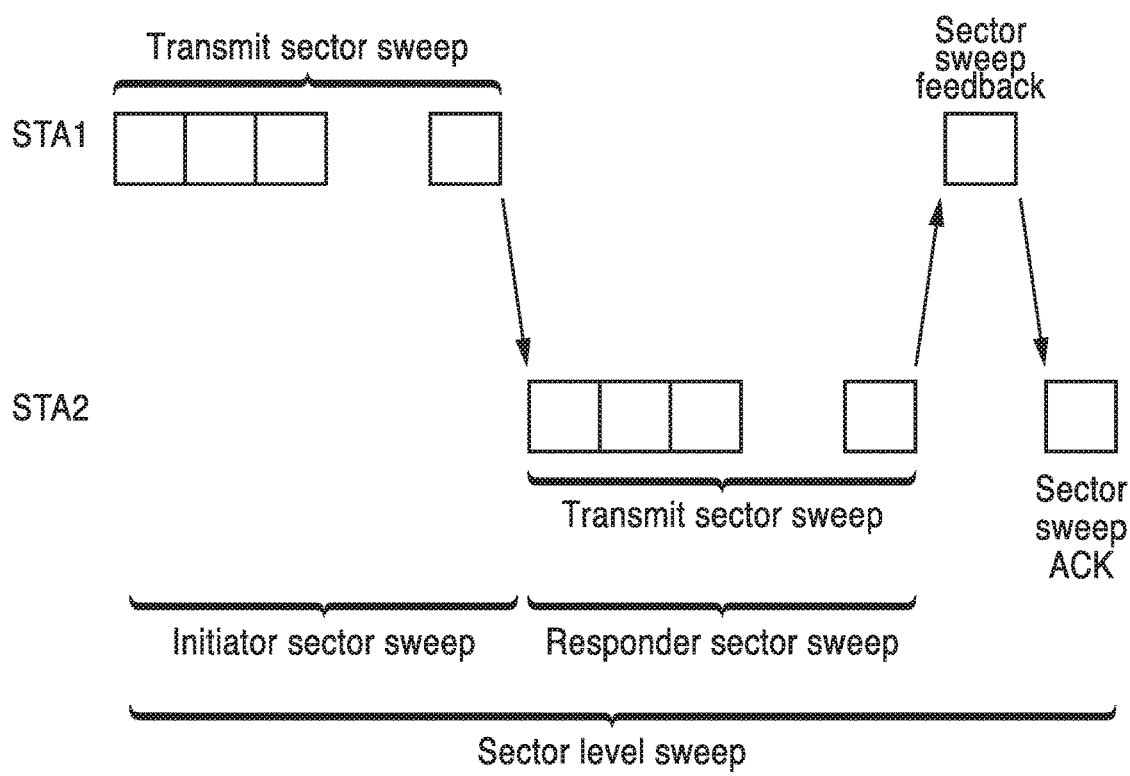
FIG. 7 is a message passing diagram showing conventional sector level sweeping (SSW).

FIG. 7 Illustrates the signaling of the SLS protocol as implemented in 802.11ad specifications for the example between STA1 and STA2. Each frame in the transmit sector sweep includes information on sector countdown indication (CDOWN), a Sector ID, and an Antenna ID. The best Sector ID and Antenna ID information are fed back with the Sector Sweep Feedback and Sector Sweep ACK frames.

FIG. 8 depicts the fields for the sector sweep frame (an SSW frame) as utilized in the 802.11ad standard, with the fields outlined below. The Frame Control field contains control information used for defining the type of frame and information necessary for the following fields to understand how to process the frame. The Duration field is set to the time until the end of the SSW frame transmission. The RA field contains the MAC address of the STA that is the intended receiver of the sector sweep. The TA field contains the MAC address of the transmitter STA of the sector sweep frame. A sector sweep (SSW) field and SSW feedback field are included along with a frame check sequence (FCS).

FIG. 9 illustrates data fields for the SSW field, with principle information as follows. The Direction field is set to 0 to indicate that the frame is transmitted by the beamforming initiator and set to 1 to indicate that the frame is transmitted by the beamforming responder. The CDOWN field is a down-counter indicating the number of remaining DMG Beacon frame transmissions to the end of the TXSS. The sector ID field is set to indicate the sector number through which the frame containing this SSW field is transmitted. The DMG Antenna ID field indicates which DMG antenna the transmitter is currently using for this transmission. The RXSS Length field is valid only when transmitted in a CBAP and is reserved otherwise. This RXSS Length field specifies the length of a receive sector sweep as required by the transmitting STA, and is defined in units of a SSW frame.

FIG. 10A and FIG. 10B depict different SSW feedback fields. The format shown in FIG. 10A is used when transmitted as part of an initiator sector sweep (ISS), while the format of FIG. 10B is used when not transmitted as part of an ISS. The Total Sectors in the ISS field indicate the total number of sectors that the initiator uses in the ISS. The Number of RX DMG Antennas subfield indicates the number of receiver DMG antennas the initiator uses during a subsequent Receive Sector Sweep (RSS). The Sector Select field contains the value of the Sector ID subfield of the SSW field within the frame that was received with best quality in the immediately preceding sector sweep. The DMG Antenna Select field indicates the value of the DMG Antenna ID subfield of the SSW field within the frame that was received with best quality in the immediately preceding sector sweep. The SNR Report field is set to the value of the SNR from the frame that was received with best quality during the immediately preceding sector sweep, and which is indicated in the sector select field. The Poll Required field is set to 1 by a non-personal basic service set control point (non-PCP) or a non-access point (non-AP) STA to indicate that it requires the PCP/AP to initiate communication with the non-PCP/non-AP. The Poll Required field is set to 0 to indicate that the non-PCP/non-AP has no preference about whether the PCP/AP initiates the communication.

3. Disclosed Joint BF Training and Mesh Discovery 3.1. Topology Under Consideration The following section considers a mmWave mesh network. Due to link budget limitations, mesh networking through multi-hop communications enables extension of the transmission range.

Figure 11:
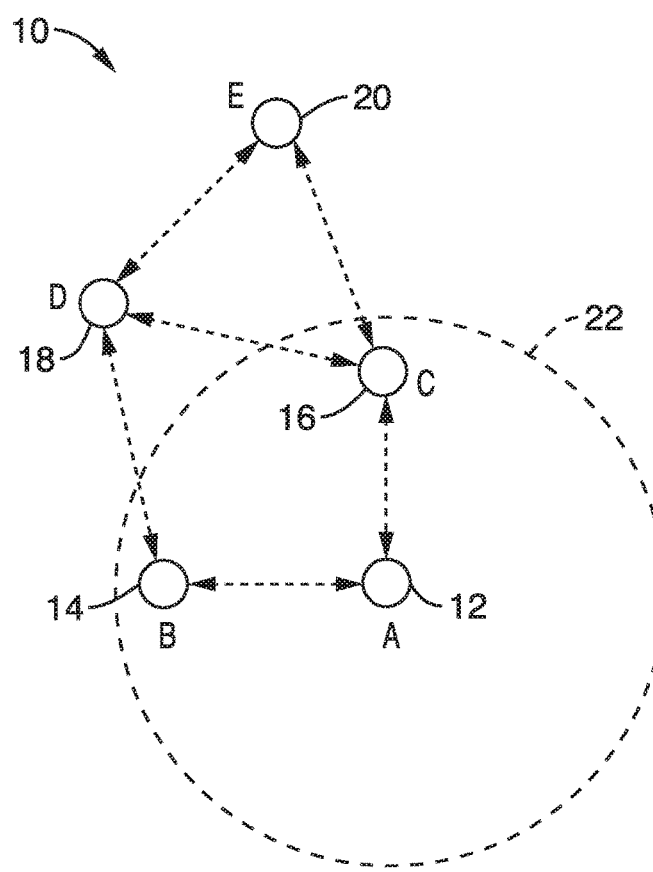
FIG. 11 is radio node topology shown by way of example for which a network protocol is executed according to an embodiment of the present disclosure.

FIG. 11 illustrates an example group of radio nodes 10 with directional transmission, and depicts connections between STA A 12, STA B 14, STA C 16, STA D 18, and STA E 20. Taking STA A 12 as an example, its transmission has a range 22 that allows communication with STA B 14 and STA C 16 with beamforming. However, STA A communication range even after beamforming is not able to reach STAs D and E. To extend the coverage of STA A in order to exchange communications with STA D or STA E, mesh network formation is required. The first step to form the mesh network is to discover the neighbor nodes and to be able to communicate directionally to the peer nodes of the mesh network.

3.2. Joint BF Training and Mesh Neighbor Discovery Protocol 3.2.1. Overview

As previously described, neighbor discovery is the first step in joining a mesh network. However, in mmWave communications, beamforming training is needed in order to communicate directionally between peer STAs. The present disclosure provides a neighbor discovery protocol for wireless mesh networks with directional transmissions. This protocol achieves joint neighborhood discovery and beamforming training in an efficient way.

Figure 12:
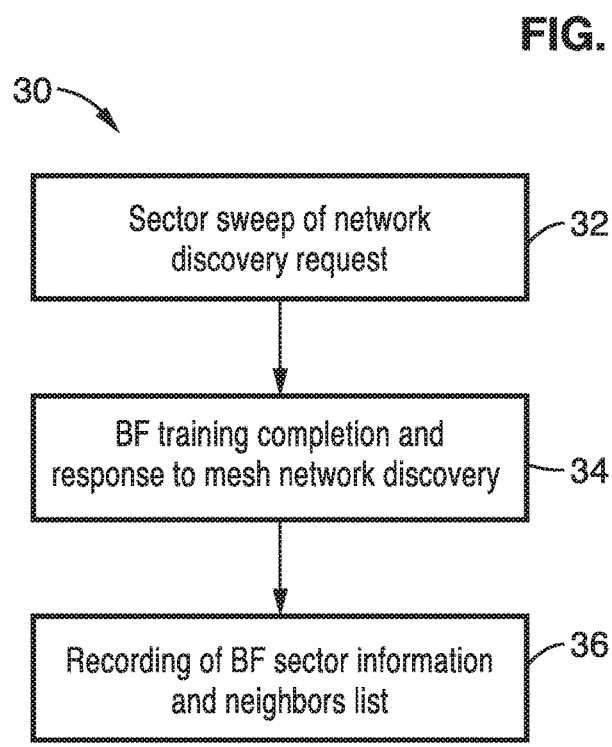
FIG. 12 is a flow diagram of a neighbor discovery protocol according to an embodiment of the present disclosure.

FIG. 12 illustrates an example embodiment 30 of high level steps in the neighbor discovery protocol. In block 32 a sector sweep of network discovery is performed, followed by BF training completion and response to mesh network discovery 34, then the recording 36 and BF sectors information and neighbor list.

3.2.2. Initiation Phase

One core of the present disclosure performing joint mesh network discovery and BF training in which the scanning for mesh network discovery, whether active or passive, is integrated within the BF training process. Scanning frames are transmitted from different antenna sectors that simultaneously serve the purpose of BF training and mesh network discovery.

Figure 13:
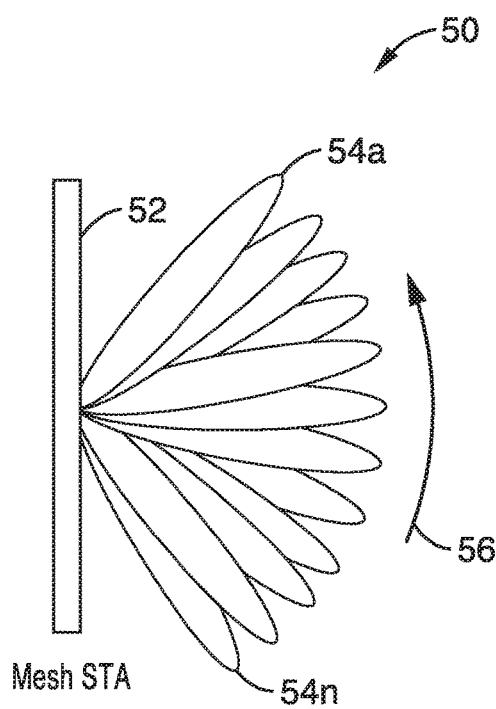
FIG. 13 is a block diagram of sector sweeping as utilized according to an embodiment of the present disclosure.

FIG. 13 illustrates an example embodiment 50 of sector sweeping for joint BF training and discovery of mesh network neighbors. A mesh station 52 is seen from which transmission sectors 54a through 54n are shown with a sector sweep direction 56. A STA willing to join a mesh network transmits a probe request (active scanning) to check availability of peer mesh STAs. Also, periodically, in order to update its BF training and neighbors list, an existing mesh STA transmits at each sector a beacon frame that can include, but is not limited to: (a) SSW field; (b) BF sector number; (c) Count Down; (d) Mesh profile field; (e) Mesh ID element; and (f) Mesh configuration element.

Figure 14:
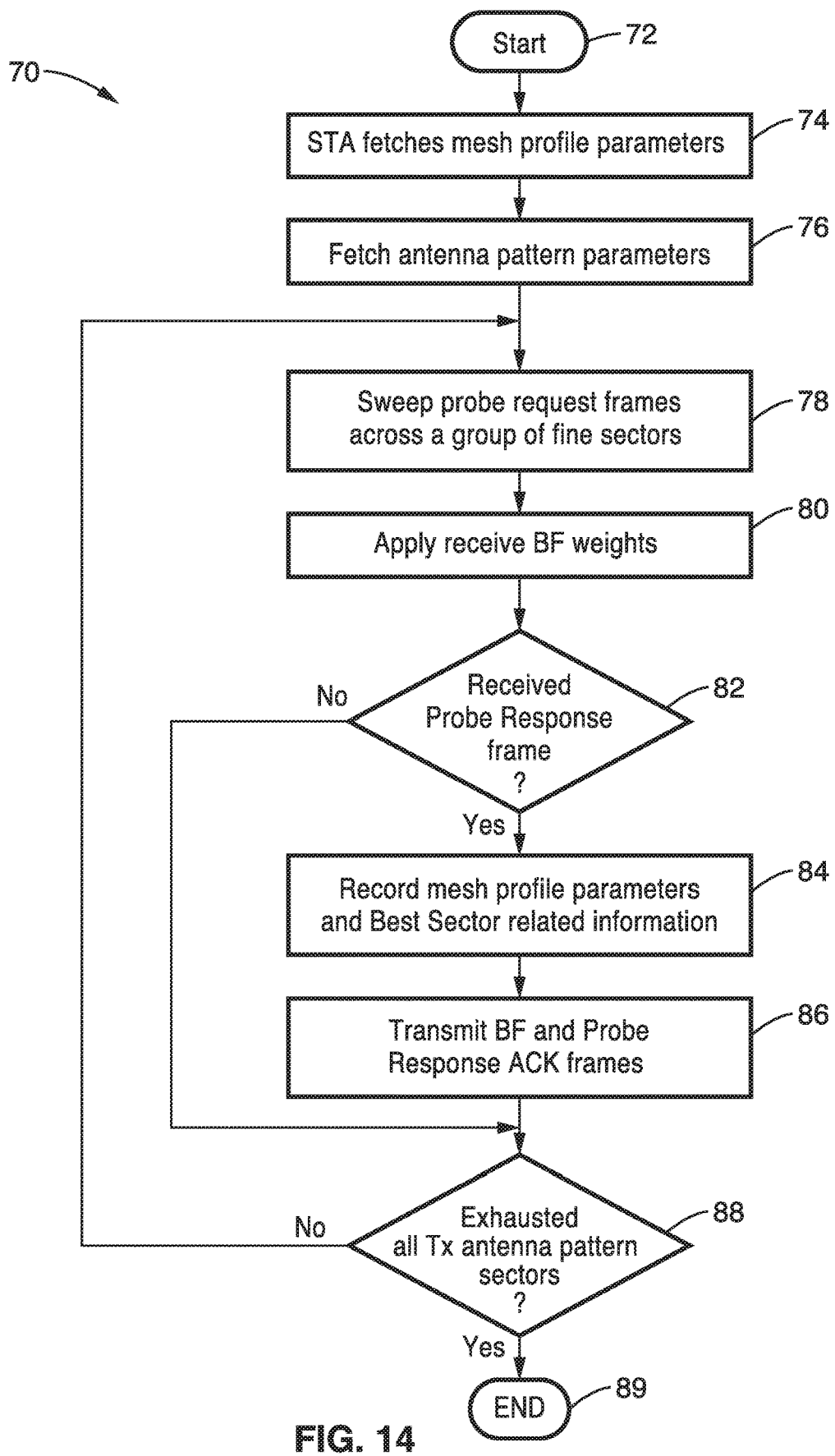
FIG. 14 is a flow diagram of STA logic for joining a mesh network according to an embodiment of the present disclosure.

FIG. 14 illustrates an example embodiment 70 of STA logic attempting to join a mesh network. At the start 72 of the process the new STA fetches 74 stored mesh profile parameters, then fetches 76 stored antenna parameters, followed by generating sweep probe request frames 78 across a group of fine sectors and applying 80 receive BF weighting. A determination is made if a probe response frame has been received 82. If the probe response is received, then at block 84 mesh profile parameters are recorded with best sector related information, and BF and probe response frames are transmitted 86, before reaching the decision of block 88. Also, if no probe response frame is received at decision block 82, then block 88 is directly executed to check if all antenna pattern sectors have been attempted. If not all antenna pattern sectors have been tried, then a jump to block 78 is made to try another one. Otherwise, with all antenna pattern sectors attempted the process ends 89.

Thus, the STA sweeps a probe request to jointly discover and initiate BF training with neighbors in existing mesh networks. The new STA can sweep the probe request across a limited number of fine sectors and wait for receiving responses from other nearby mesh STAs. It repeats the sweeping, but with a new set of fine sectors until it has covered all the sectors of the transmit antenna pattern.

Figure 15A:
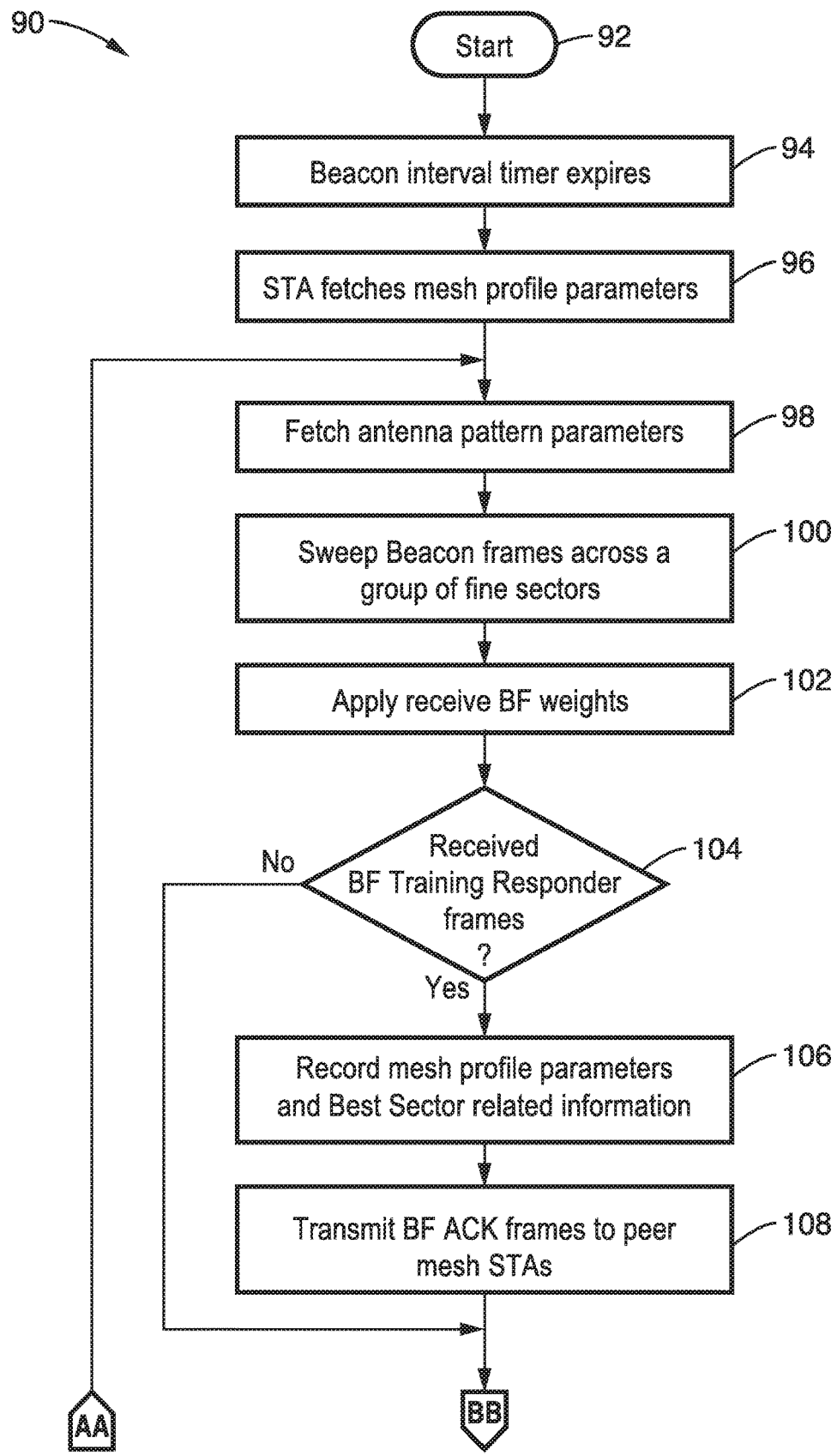
FIG. 15A and FIG. 15B is a flow diagram of alternate embodiment for an existing mesh STA to transmit periodic beacons according to an embodiment of the present disclosure.
Figure 15B:
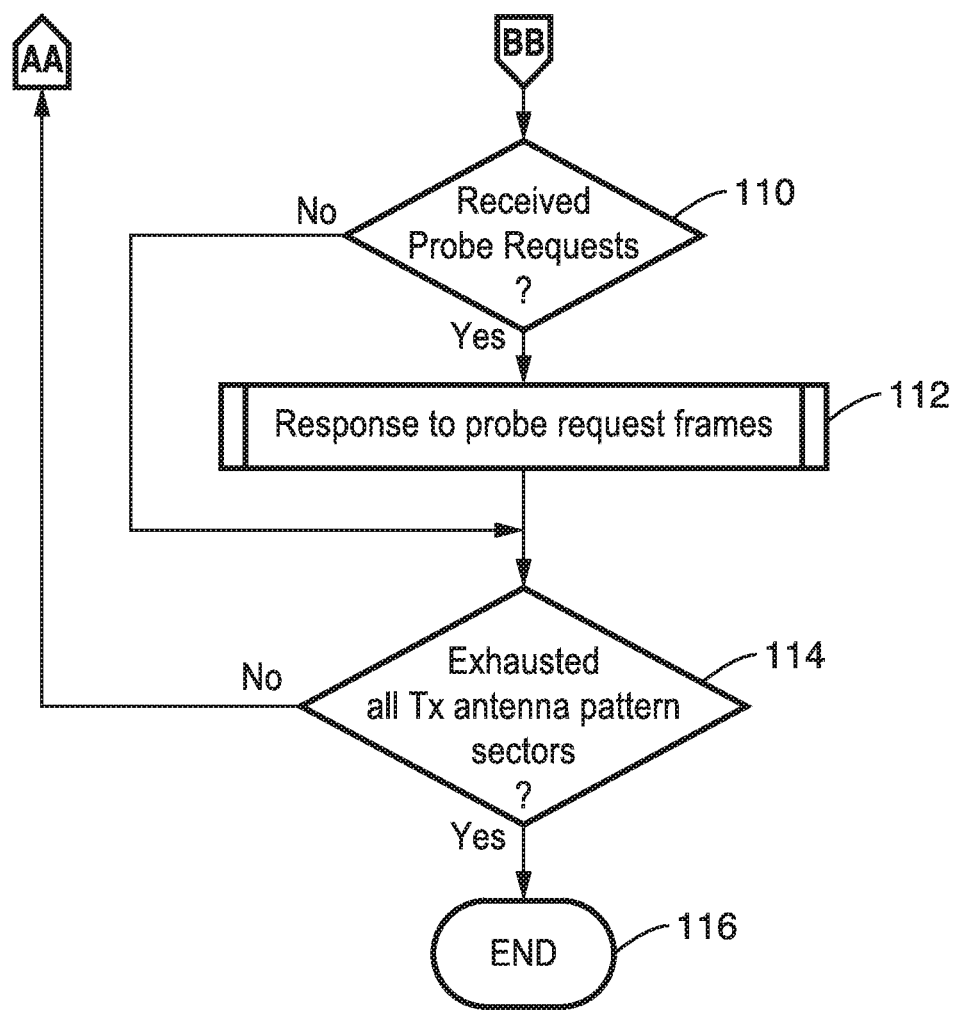

FIG. 15A and FIG. 15B illustrates an example embodiment 90 of the alternative to FIG. 12 of logic implemented by an existing mesh STA to transmit periodic beacons. The routine commences at block 92 with the beacon interval timer expiring 94, upon which the STA fetches 96 stored mesh profile parameters, fetches 98 antenna pattern parameters, then it sweeps beacon frames 100 across a group of fine sectors, before applying receive BF weights 102. In block 104 a determination is made if BF training responder frames have been received. If the frames are received, then at block 106 mesh profile parameters and best sector related information are recorded (stored), prior to transmitting BF ACK frames 108 to peer mesh STAs. After block 108, or if no BF training responder frames are received at block 104, then decision block 110 is reached in FIG. 13B to determine if probe requests have been received. If probe requests were received, then at block a response is made 112 to the probe request frames. Otherwise, block 112 is skipped, and decision 114 checks if all transmit antenna pattern sectors have been checked. If not all antenna sectors have been checked, then execution moves back to block 98 for additional sectors. Otherwise, if all antenna pattern sectors have been checked, then the process ends 116.

Thus, it can be seen that upon expiration of the beacon interval timer, the existing mesh STA sweeps the beacon frames to allow other nodes in its vicinity to know about its existence and that it belongs to a specific mesh network. The beacons are also used to perform BF training with other mesh nodes. While during reception time, the mesh STA may receive requests from new STAs to join the mesh network (probe requests) and respond to these requests. The response to probe requests is shown as a subroutine detailed in FIG. 16 in the next section. The sweeping process is repeated in a way similar to what was described above for a new STA.

3.2.3. Response Phase

Another core of the present disclosure is to have a mesh STA respond simultaneously to the network discovery and BF training frames sent by another STA. The responder SSW and mesh acknowledgment frames are swept across all sectors. The contents of the responder SSW and mesh acknowledgment frames may contain: (a) Acknowledgment and exchange of node IDs by peer STA; source and destination addresses; and (b) BF training feedback with best received sector from mesh STA initiator and corresponding link metric (e.g., SNR).

Since the frames are swept across all TX sectors, existing mesh
STAs in the network will overhear the initializing mesh STA node ID and the acknowledgment of the mesh peer STA in addition to the connection quality. In the above way, the mesh network discovery will grow and STAs can quickly learn about new STAs that are out of range (or with blocked links) and which mesh STA that can act as relays toward out of range STAs.

Figure 16:
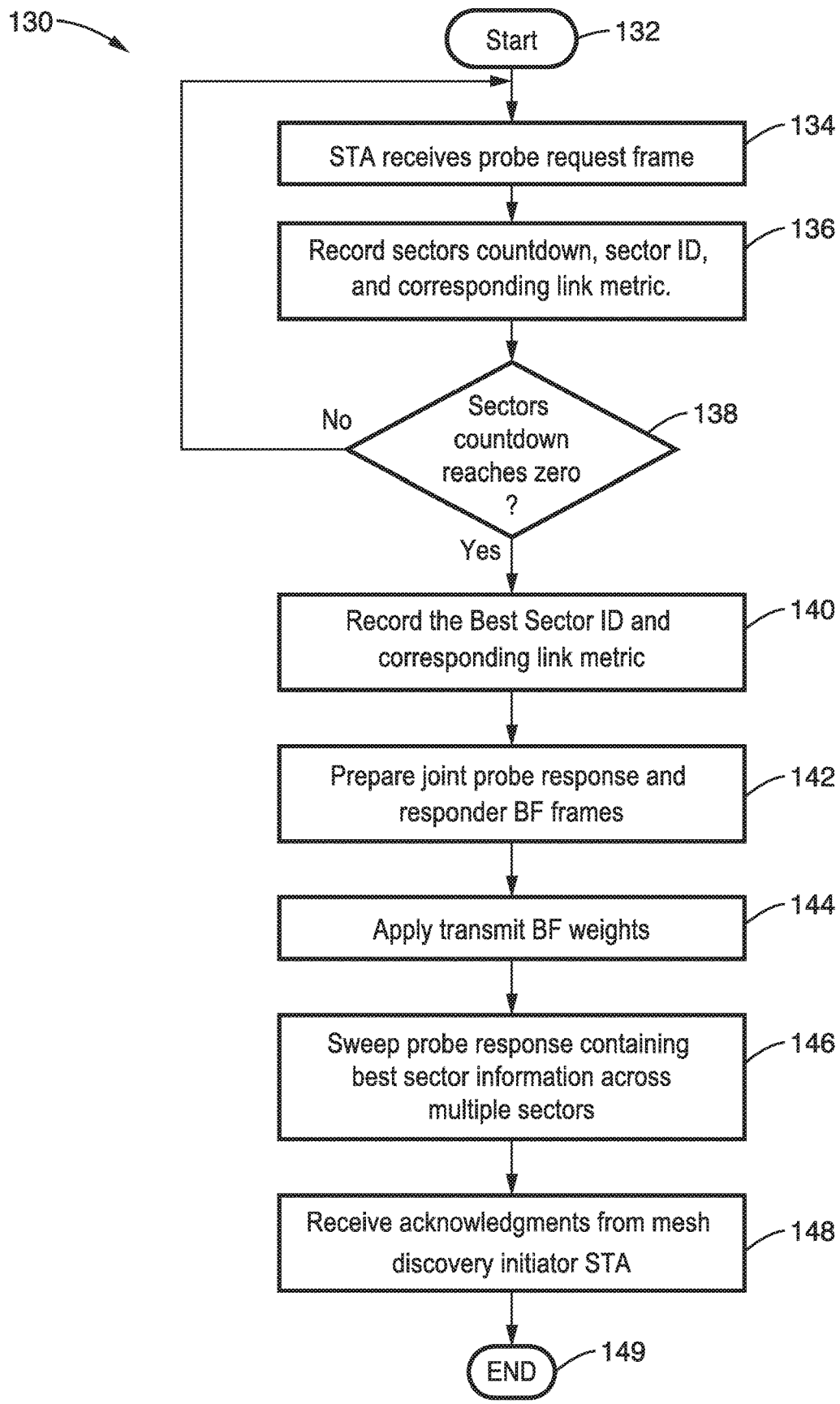
FIG. 16 is a flow diagram of a response by a mesh STA that received a probe request from a new STA willing to join the mesh network according to an embodiment of the present disclosure.

FIG. 16 illustrates an example embodiment 130 of response by a mesh STA that received a probe request from a new STA willing to join the mesh network, as seen in block 112 in FIG. 13B. The subroutine starts 132 as the STA receives 134 probe request frame, upon which it records 136 (stores) sectors countdown, sector ID, and corresponding link metric. A decision block is reached 138 to determine if the sectors count down has reached zero. If the countdown has not reached zero, then execution returns to block 134, otherwise block 140 records the best sector ID and corresponding link metric. The STA prepares 142 a joint probe response and responder BF frames, and applies 144 transmit BF weights. The STA then performs a sweep probe response 146 containing best sector information across multiple sectors. Then the STA receives 148 acknowledgements (ACKs) from the mesh discovery initiator STA, after which the routine ends 149.

Thus, it is seen above that the existing mesh STA keeps listening to the incoming probe request frames from multiple sectors until the sectors countdown reaches zero. It then processes the best sector info and aggregates mesh profile parameters into a single frame. It sweeps this joint BF responder frame and probe response frame across multiple sectors. Finally, it waits for acknowledgment for the probe response and best BF sector towards the new STA.

Figure 17:
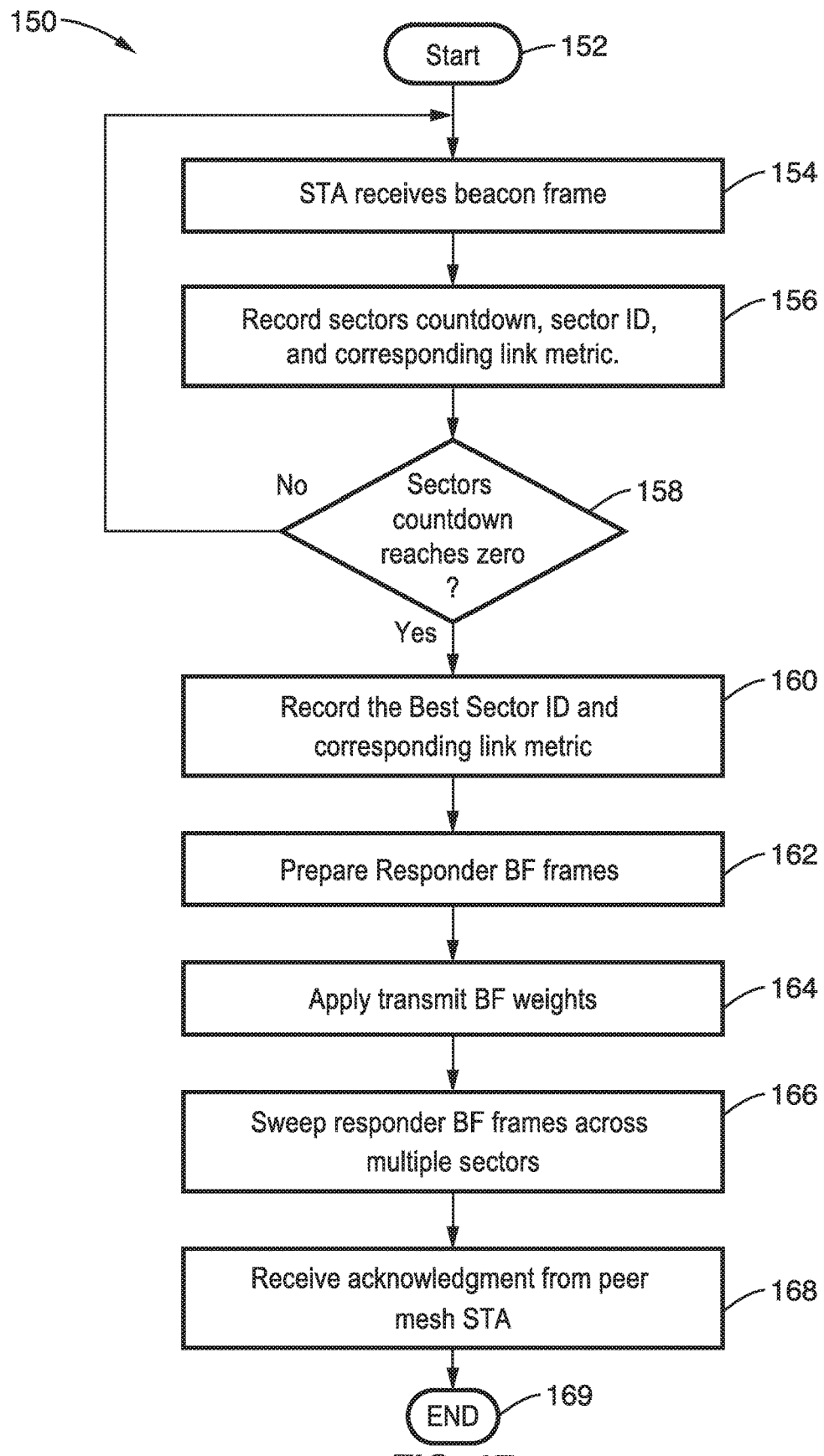
FIG. 17 is a flow diagram of a response of a mesh STA that received a periodic beacon frames from a peer mesh STA according to an embodiment of the present disclosure.

FIG. 17 illustrates an example embodiment 150 of the response of a mesh STA that received a periodic beacon frames from a peer mesh STA. In prior art on mesh networking, e.g., 802.11s, beacons are used to broadcast the existence of the node and the mesh network capability. However, in the present disclosure, beacons also serve as a means to perform periodic BF training with other nodes in the mesh network in addition to notifying new STAs about the existence of a mesh network.

In the figure, the routine starts 152 when the STA receives 154 a beacon frame, then it records (stores) 156 sector countdown, sector ID, and corresponding link metric. A decision is reached 158 to determine if the sectors countdown has reached zero. If it has not reached zero, then execution returns back to block 154. Otherwise, with countdown at zero, block 160 is reached and records (stores) the best sector ID and corresponding link metric, after which the STA prepares 162 responder BF frames, and then applies transmit BF weights 164 and sweeps 166 responder BF frames across multiple sectors. The station afterward receives 168 acknowledgement from a peer mesh station, after which the routine ends 169.

3.2.4. Frame Contents

To enable the operation of the joint BF training and mesh discovery protocol, new information elements (IEs) are proposed that are included in the SSW probe request and response frames. A new frame format, the Mesh SSW (MSSW) frame is introduced.

FIG. 18 depicts an example embodiment 170 of the body of the MSSW Control frame showing the following:

RX Start: start of reception time corresponding to this direction relative to the start of this frame;

RX Duration: integer number of slots dedicated for reception of response frames to this MSSW;

MSSW: mesh SSW IE, to be detailed in next sections;

MSSW-FB: mesh SSW feedback IE, to be detailed in next sections;

Mesh ID: IE to advertise identification Mesh Network; and

Mesh Configuration: IE to advertise mesh services.

The MSSW IE is similar to the state-of-the-art SSW IE used in 802.11ad specifications with some modifications.

FIG. 19 depicts an example embodiment 180 of MSSW IE, with field contents as follows. The Direction field is set to 0 to indicate that the frame is transmitted by the beamforming initiator and set to 1 to indicate that the frame is transmitted by the beamforming responder. The Groups field is set to the number of fine sectors groups as explained in the specifications of this invention. The Group ID indicates the group which the sector that transmits the current frame belongs to. The CDOWN field is a down-counter indicating the number of remaining DMG Beacon frame transmissions to the end of the TXSS. The sector ID field is set to indicate sector number through which the frame containing this SSW field is transmitted. The DMG Antenna ID field indicates which DMG antenna the transmitter is currently using for this transmission. The RXSS Length field is valid only when transmitted in a CBAP and is reserved otherwise. This RXSS Length field specifies the length of a receive sector sweep as required by the transmitting STA, and is defined in units of a MSSW frame.

FIG. 20 depicts an example embodiment 190 of the MSSW-FB IE. Compared to the SSW-FB IE in the 802.11ad specifications, the MSSW-FB field prepends the Group ID at the start of the MSSW-FB IE, and the Group ID indicates the group number of the sector that the current frame feedbacks information about.

4. Signaling for Joint BF Training and Mesh Network Discovery 4.1. Alternate Transmit and Receive Sectors Sweeping At the core of the presently disclosed joint mesh and BF training is the signaling method to jointly sweep across antenna sectors and scan neighbor mesh nodes. In one embodiment, the present disclosure utilizes alternate TX and RX sector sweeping including mesh scanning signals.

FIG. 21A illustrates an example embodiment 210 of fine sector sweeping during transmit sector BF training and coarse sectors receive BF training. In the figure, a mesh STA 212, is seen with TX antenna sectors 214 shown in groups 216, 218 and 220.

FIG. 21B illustrates an example embodiment 230 which maps the concept from FIG. 21A to the time domain 231. Alternate periods of transmission with fine sectors (TX BF) and receptions with coarse RX BF are seen in the figure. A transmission is generated 232 to sector group 216 of FIG. 19A, and in response to which a coarse BF is received 234. Then a transmission 236 from sector group 218 from FIG. 19A, followed by a coarse RX BF period 238. Similarly, a transmission 240 from sector group 220 from FIG. 19A, followed by another coarse RX BF period 242.

Thus, it is seen that during the transmission interval, SSW frames with mesh configuration information are directionally transmitted. During the reception period, the mesh acknowledgments are received from other mesh STA in the form of responder SSW frames. The transmission time "t" is dependent on the number of TX sectors and the precision desired for the coarse RX BF design. The reception time "r" is flexible. It can be made to accommodate acknowledgments from multiple neighbor mesh STAs. It also allows sharing the medium for ongoing data transmissions or for periodic joint neighbor discovery and BF training phase from other STAs.

4.2. One Shot Transmit and Receive Sectors Sweeping

In another embodiment, one BF training transmission interval is considered followed by a BF training reception interval. As in the previous embodiment, transmission is performed with fine array pattern sectors while reception is performed with coarse RX beamforming. The receive BF interval in this embodiment, is however, divided into slots. During each slot, only some neighbor mesh STA will contend to access the channel and complete the BF training, that also contains the mesh discovery response, with the initiator STA.

FIG. 22 illustrates an example embodiment 250 of the one shot SSW transmission and reception BF, along time 251. Channel access of neighbor mesh STAs during reception period is performed through the mechanism of sector grouping. In period 252 SSW and mesh scanning frames are sent for groups 216, 218, 220 as seen in FIG. 19A. In response, weights for coarse receive beamforming patterns are applied during 254, 256, and 258, respectively. In this way, a group of transmit sectors are mapped to a group ID. This group ID is signaled in every frame of the joint BF training and mesh discovery request signal. Details of which have been described in the MSSW IE, see FIG. 19 for the details. When this group ID is processed by a neighbor STA, it maps this group index to a transmission slot. It then accesses the channel and completes the BF training together with responding to the mesh network discovery message only during this specific transmission slot.

5. Adaptive Signaling for Mesh Network Discovery

5.1. Overview

Another core of the present disclosure is describing the adapting of different parameters of the mesh network discovery signaling. Concepts of partial BF training, freezing of BF training, and starting and resuming of mesh network discovery are disclosed.

In addition, flexible time is allocated for alternate transmission and reception of the simultaneous BF training and mesh network discovery frames. Factors that affect the early termination decision and the time allocated for transmission and reception include the antenna capabilities of the STA, the responses received from other mesh STAs, as well as the latency allowed for a specific traffic type, a quality of service (QoS) constraint. The flexibility allowed by this adaptive scheme enables efficient discovery and data exchange in mesh networks with various levels of node density.

5.2. Freezing of Training and Mesh Discovery

FIG. 23 illustrates an example embodiment 270 of freezing BF training and mesh discovery along time line 272. The joint BF training and mesh discovery is halted after two periods 274, 278 of mesh scanning as many responses 276, 280 have been received from neighbor STAs, including other mesh STAs 282. The mesh STA makes a local decision to commence communication 284 with the discovered mesh STAs 286, 288, to avoid latency in delivering the data packets. Afterwards, the STA resumes 290, 294, the joint BF training and mesh discovery, with response 292, until it finishes sweeping all the transmit sectors. After which the STA commences communication 296 with the other stations.

5.3. Flexible Mesh Discovery Transmission and Reception Times

FIG. 24A through FIG. 24C illustrates allocating flexible transmission times. In FIG. 24A is illustrated an example embodiment 310 which assumes a mesh STA 312 is configured with a plurality, exemplified herein as six, fine transmit sectors 314a through 314n. In FIG. 24B is illustrated an example embodiment 330 over time line 332 in which it is decided to sweep two sectors at each period of mesh scanning. Thus, in a period "t_a" 338 sector 1 is swept 334 and sector 2 is swept 336, followed by a reception period "r" 340. Similarly, sector 3 is swept 342 and sector 4 is swept 344, then in a later period sector 5 is swept 346 and sector 6 is swept 348.

In FIG. 24C is illustrated an example embodiment 350 over the same time line 332, in which it is decided to sweep three sectors at each period of mesh scanning. Thus, in a period "t_b" 352 sector 1 is swept 334, sector 2 is swept 336, and sector 3 is swept 342 followed by a reception period "r" 354. Then in a later period sector 4 is swept 344, sector 5 is swept 346, and sector 6 is swept 348. The sweeping pattern in FIG. 24B compared to that of FIG. 24C has the advantage of decreasing chances of collision during reception of responses from neighbor STAs while it has the disadvantage of increased overall time to finish one cycle of mesh network discovery.

FIG. 25A and FIG. 25B illustrates example embodiments 390, 410 of allocating flexible reception time across a time line 332. In these figures, the transmission duration "t" 392, 412, respectively, is the same within a period of mesh discovery. However, In FIG. 25B, more time, "r_b" 414, as compared to time "r_a" 394 is allocated for reception of responses or beacons from existing mesh STAs. It is seen in both, that sectors 1 through 6 are swept 334, 336, 342, 344, 346 and 348. The longer reception time decreases collision probability during reception of responses from neighbor STAs and causes less disruption to ongoing data transmissions between existing mesh STAs. However, longer reception times as depicted in FIG. 25B compared to those of FIG. 25A increase the overall time to finish one cycle of mesh network discovery.

5.4. Logic to Adapt Mesh Discovery Signals

FIG. 26A through FIG. 26B illustrates an example embodiment 430 of logic implemented by a STA to adapt the mesh discovery signaling. The following nomenclature is found in the flow diagram:

N: total number of transmit sectors;
L: maximum tolerable latency;
G: number of sector groups or number of mesh scanning periods;
g: running index for groups of sectors;
M: number of transmit sectors swept per group;
Ts: time needed to sweep one frame from a single sector;
j: fraction representing amount of time allocated for a single sweeping period of mesh discovery frames relative to the latency;
q: a number representing the amount of time allocated for reception relative to transmission in a single mesh scanning period;
R: number of mesh discovery responses received from existing mesh STAs up to a given point in time;
R*: Pre-defined threshold for R;
D: Time spent for mesh discovery at a given point in time; and
k: fraction representing the amount of time allocated for partial mesh scanning relative to the latency.

The previous parameters enable adaptation of the mesh discovery signaling to achieve the freezing of BF training and/or flexible transmission and reception times. The process starts 432 and the STA fetches 434 stored transmit antenna capability, with record N containing 436 the number of sectors. Then Ts is determined (computed) 438 as the sweeping time of a single fine sector. STA fetches 440 stored quality of service (QoS) requirements, and records L 442 as the maximum recommended latency. A determination (computation) 444 of M=(L*j)/Ts as the maximum number of fine sectors per group. Then value G is determined (computed) 446 as G=N/M. In block 448 r is determined as M*Ts*q as the reception period. A mesh discovery frame is prepared in block 450, and g is initialized 452 to 1, then the mesh discovery frame is swept 454 through the g-th group of sectors. Then in block 458 of FIG. 26B the RX BF weights are applied, and then the received mesh and BF training responses are processed 460. A decision is made at block 462 if the number of mesh discovery responses (R) is greater than a predefined threshold (*R) and at the same time that the time spent on mesh discovery at a given point in time (D) is greater than the maximum tolerable latency (L) times the fraction representing the time allocated for partial scanning (k).

If the relation is met in decision 462, with both conditions met, then block 464 is executed with the peering process started including data exchange with discovered mesh STAs. After which, the value R and D are reset 466 to zero, and execution moves to decision block 468 where a check is made if the running index (g) is equal to the number of sector groups or number mesh scanning periods (G). If this condition is met, the process ends 469, otherwise a return is made to block 456 in FIG. 26A where the running index is incremented (g=g+1), and execution moves to block 454 of that figure.

For an example of the above, assume a STA with the following parameters; N=16 sectors, L=2 msec latency, Ts=50 µs, j=0.1, k=0.4, q=2, R*=10. To compute the number of sectors per scanning period, M=L*j/Ts=2000*0.1/50=4 sectors. To compute the number of sector groups or the number of scanning periods G, the relation G=N/M=4 periods or groups. The transmission time per group is M*Ts=4*50=200 µs. And the reception time per group is r=M*Ts*q=4*50*2=400 µs. Hence, in this example one cycle of mesh discovery transmission and reception takes 600 µs.

Assuming that the number of mesh discovery responses, either probe responses or beacons from existing STAs, received after the first mesh discovery period is four. Hence R=4<R*. At this point in time, D=600 µs, L*k=2000*0.4=800 and it is clear that D<L*k. Hence the condition to freeze the mesh discovery as explained for FIG. 26A and FIG. 26B is not met.

Proceeding with the second cycle of mesh discovery, in this scenario it is assumed that seven more responses are received. At this point in time, D=1200 µs, R=4+7=11. Hence the condition to freeze the mesh discovery is met. Mesh discovery will be halted temporarily. The STA begins mesh peering, and possibly data exchange with mesh stations already discovered so far. Afterwards, the STA can resume BF training and mesh discovery by sweeping other groups of sectors.

Figure 27A:
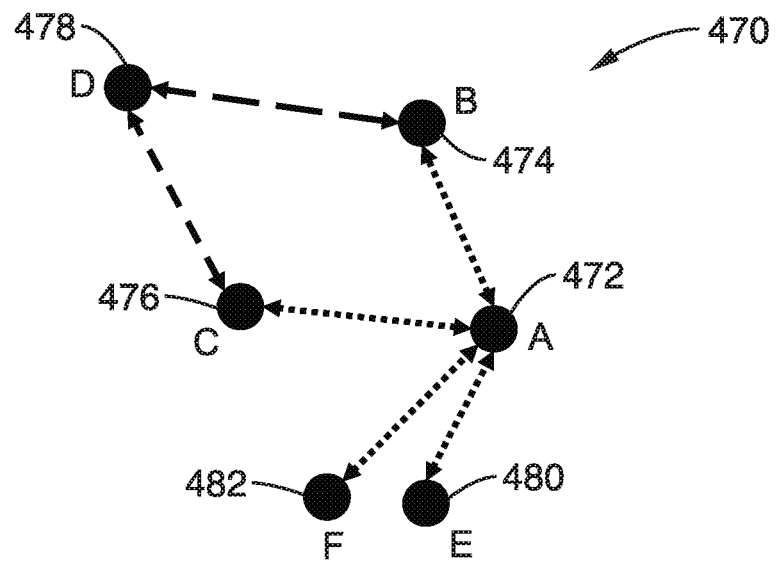

FIG. 27A through FIG. 27F illustrate a mesh discovery protocol. In FIG. 27A is an example embodiment 470 of group of mmWave mesh network STAs, showing STA A 472, STA B 474, STA C 476, STA D 478, STA E 480, and STA F 482. The following scenario is considered with STAs B, C, D, E and F within an existing mesh STA, to which STA A would like to be a member. The dashed arrows depict ongoing communications between existing mesh STAs B, C and D, while the dotted arrows show that STAs B, C, E, and F are within the transmission range of STA A.

Figure 27B:
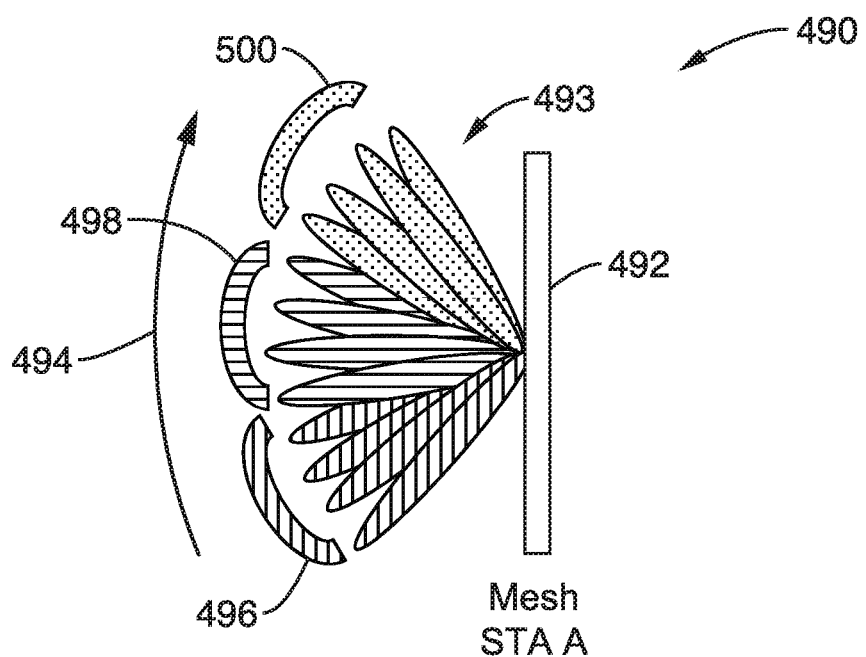

In FIG. 27B is an example embodiment 490 of TX and RX BF sectors for STA A 492, showing twelve fine TX sectors 493 divided into three groups 496, 498 and 500, each with four sectors involved in sector sweep 494. The grouping follows the logic explained in a previous section. Three coarse BF sectors during reception improves the chance of detecting responses from nearby STAs.

FIG. 27C illustrates one example embodiment 510 of sweeping the mesh discovery frames over time line 511. Alternate transmission and reception for mesh discovery responses is performed. Sweeping is shown for each of the sector groups, a first group 496 in FIG. 27B sweep 512 with response 514, then an ACK is sent for the mesh discovery response frame 516. Followed by a second group 498 in FIG. 25B sweep 518 followed by responses 520, then a mesh discovery ACK 522. Finally a third group 500 from FIG. 27B sweep 524, followed by response 526, then a mesh discovery ACK 528.

It will be noted that after sweeping the mesh discovery frames through a group of fine sectors, STA A applies BF RX weights to wait for mesh discovery response frames or beacons from existing mesh STAs. Acknowledgments 516, 522, 528 for the mesh discovery response frames are sent before sweeping a new group of fine sectors.

In FIG. 27D illustrates an example embodiment 530 the reception of responses by STA A over the same time line 511. Responses are seen coming in for STA F 532, STA E 534, STA C 536 and STA B 538. It should be noted that a single group of sectors at STA A cover both STAs E and F. During the first reception period at STA A, both STAs E and F compete for channel access to respond to STA A. In the second reception period, STA C is the only STA listening to the sweeping of mesh discovery sectors from STA A. STA C responds to the mesh discovery frames during the second reception period. It should be appreciated that STA C is involved in communications with the existing mesh network. However, the sweeping of the first group of sectors by STA A and the relatively large reception period allows ongoing communications of STA C to take place without disruption from STA A. Similarly in the third reception period, only STA B responds to the frames swept through the third group of sectors.

Since the number of responses received from neighbor STAs are limited, STA A decides not to halt the mesh discovery/BF training phases as explained in a prior section. STA A finishes the mesh discovery phases and then afterwards start peering and data exchange with already discovered STAs.

FIG. 27E and FIG. 27F illustrate embodiments 550, 570 over the same time line 511, of a variation for alternate transmission and reception of mesh discovery/BF training as explained in a previous section. In FIG. 27E, after sweeping all the fine sectors, with sweeps 552, 554, 556, STAs that hear the mesh discovery frames compete during specific reception periods to respond back 558, 560 and 562, with mesh network response frames. STA A, after finishing all reception periods, schedules multiple Acknowledgment frames (ACKs) 564 directionally to the mesh STAs that transmitted mesh discovery response frames. In FIG. 27F is illustrated an example 570 of response reception by STA A, comprising responses coming in for STA F 572, STA E 574, STA C 576 and STA B 578.

FIG. 28A illustrates an example embodiment 590 of station (STA) hardware configuration. In this example an external I/O connection 592 is shown coupled to bus 594, upon which a computer processor (CPU) 596 and memory (RAM) 598 are attached. The external I/O provides the STA with external I/O, such as to sensors, actuators and so forth. Instructions from memory 598 are executed on processor 596 to execute a program which implements the communication protocols. This host machine is shown configured with a modem 600, coupled between bus 594 and radio-frequency (RF) circuitry 602a, 602b, 602C, each supporting a plurality of antennas 604a through 604n, 606a through 606n, and 608a through 608n, to transmit and receive frames with neighboring STAs. Although three RF circuits are shown in this example, embodiments of the present disclosure can be configured with modem 600 coupled to any arbitrary number of RF circuits. In general, using a larger number of RF circuits will result in broader coverage of the antenna beam direction. It should be appreciated that the number of RF circuits and number of antennas being utilized is determined by hardware constraints of a specific device. Some of the RF circuitry and antennas may be disabled when the STA determines it is unnecessary to communicate with neighbor STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector. Antenna sector is determined by a selection of RF circuitry and beamforming commanded by the array antenna controller. Although it is possible that STA hardware components, such as 596 through 604c, have different functional partitions from the one described above, such configuration can be deemed to be a variant of the explained configuration.

FIG. 29 illustrates an example embodiment 630 of antenna transmit directions available to an STA to generate a plurality of (e.g., 36) antenna sector patterns. By way of example and not limitation, the STA is shown implementing three RF circuits 632a, 632b, and 632c and their connected antennas. Each RF circuit and its connected antenna generates multiple (e.g., 12) beamforming patterns, depicted as 634a through 634n, along with similar patterns 636, 638, wherein the STA provides a total of 36 antenna sectors. For the sake of simplicity of description, and not limitation, it is assumed that all STAs have four antenna sectors. Any arbitrary beam pattern can be mapped to an antenna sector. Typically, the beam pattern is formed to generate a sharp beam, but it is possible that the beam pattern is generated to transmit or receive signals from multiple angles.

The enhancements described in the presented technology can be readily implemented within various wireless communication devices. It should also be appreciated that wireless data communication devices are typically implemented to include one or more computer processor devices (e.g., CPU, microprocessor, microcontroller, computer enabled ASIC, etc.) and one or more associated memories storing instructions (e.g., RAM, DRAM, NVRAM, FLASH, computer readable media, etc.) whereby programming (instructions) stored in the memory are executed on the processor to perform the steps of the various process methods described herein.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely, such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple embodiments which include, but are not limited to, the following:

1. An apparatus for wireless communication with directional transmission, comprising: (a) a wireless communication circuit configured for wirelessly communicating with other wireless communication stations utilizing directional transmission having a plurality of antenna pattern sectors each having different transmission directions; (b) a processor coupled to said wireless communication circuit; (c) a non-transitory memory storing instructions executable by the processor; and (d) wherein said instructions, when executed by the processor, perform steps comprising: (d)(i) commencing or responding to a joint process for beamforming (BF) training for said antenna pattern sectors and scanning for mesh network discovery, in which frames are swept through said antenna pattern sectors and contain information about mesh network ID and mesh network capabilities in addition to beamforming (BF) training frames which comprise information on directional operation parameters and sector sweep information; (d)(ii) performing in a single phase for said process of BF training, a fine transmit-side training and a coarse receive-side training, in which a mesh STA with directional transmission sweeps BF training frames across fine sectors in a transmission period and receives BF responder frames on coarse sectors; and (d)(iii) adapting said process for joint BF training and mesh network discovery, with programming to determine partial BF training and flexible time allocation for transmission and reception periods of said BF training frames.

2. The apparatus of any preceding embodiment, wherein said wireless communication apparatus performs a multiple-hop communication network protocol for directional transmission in the PHY layer of said multiple-hop communication network protocol.

3. The apparatus of any preceding embodiment, wherein said wireless communication apparatus performs a multiple-hop communication network protocol for directional transmission for a station operating in a mode selected from a group of station type modes consisting of source station, destination station, intermediate (hop) station, mesh access point, client station, mesh station, portal station, multiple input multiple output station, and single input single output station.

4. The apparatus of any preceding embodiment, wherein said wireless communication apparatus is configured for operating in a network containing any desired combination of mesh and non-mesh stations.

5. The apparatus of any preceding embodiment, wherein said wireless communication circuit is configured for transmitting and receiving on millimeter wave frequencies.

6. An apparatus for wireless communication with directional transmission, comprising: (a) a wireless communication circuit configured for wirelessly communicating with other wireless communication stations; (b) wherein said wireless communication circuit is configured with directional transmission having a plurality of antenna pattern sectors each having different transmission directions; (c) a processor coupled to said wireless communication circuit; (d) a non-transitory memory storing instructions executable by the processor; and (e) wherein said instructions, when executed by the processor, perform steps comprising: performing simultaneous BF training and scanning for mesh network discovery, whereby frames are swept through antenna pattern sectors and contain information about mesh network ID and mesh network capabilities in addition to BF training frame information including directional operation parameters and sector sweep information.

7. The apparatus of any preceding embodiment, wherein said instructions when executed by the processor further perform steps comprising: receiving joint network entry and BF training frames by mesh STAs which transmit response frames that comprise sector sweep responder information and mesh network configuration.

8. The apparatus of any preceding embodiment, wherein said instructions when executed by the processor further perform steps comprising: performing an adaptive neighbor discovery scheme in which partial BF training and early termination of BF training and mesh network discovery are decided together with allocating flexible time for alternate transmission and reception of simultaneous BF training and mesh network discovery frames.

9. The apparatus of any preceding embodiment, wherein said instructions when executed by the processor further perform steps comprising: performing fine transmit BF training and coarse receive BF training in a single phase, whereby a mesh STA with directional transmission sweeps BF training frames across fine sectors in a transmission period and receives BF responder frames on coarse sectors.

10. The apparatus of any preceding embodiment: (a) wherein said wireless communication apparatus performs a multiple-hop communication network protocol for directional transmission in the PHY layer of said multiple-hop communication network protocol; (b) wherein said wireless communication apparatus performs a multiple-hop communication network protocol for directional transmission for a station operating in a mode selected from a group of station type modes consisting of source station, destination station, intermediate (hop) station, mesh access point, client station, mesh station, portal station, multiple input multiple output station, and single input single output station; and (c) wherein said wireless communication apparatus is configured for operating in a network containing any desired combination of mesh and non-mesh stations.

11. An apparatus for wireless communication with directional transmission, comprising: (a) a wireless communication circuit configured for wirelessly communicating with other wireless communication stations; (b) wherein said wireless communication circuit is configured with directional transmission having a plurality of antenna pattern sectors each having different transmission directions; (c) a processor coupled to said wireless communication circuit; (d) a non-transitory memory storing instructions executable by the processor; and (e) wherein said instructions, when executed by the processor, perform steps comprising: performing directional transmission with an adaptive neighbor discovery scheme in a mesh network, whereby partial BF training and early termination of BF training and mesh network discovery are decided together with allocating flexible time for alternate transmission and reception of simultaneous BF training and mesh network discovery frames.

12. The apparatus of any preceding embodiment, wherein said instructions when executed by the processor further perform steps comprising: performing simultaneous BF training and scanning for mesh network discovery, in which frames are swept through antenna pattern sectors and contain information about mesh network ID and mesh network capabilities in addition to BF training frame information including directional operation parameters and sector sweep information.

13. The apparatus of any preceding embodiment, wherein said instructions when executed by the processor further perform steps comprising: receiving joint network entry and BF training frames by mesh STAs which then transmit response frames that include sector sweep responder information and mesh network configuration.

14. The apparatus of any preceding embodiment, wherein said instructions when executed by the processor further perform steps comprising: performing fine transmit BF training and coarse receive BF training in a single phase, in which a mesh STA with directional transmission sweeps BF training frames across fine sectors in a transmission period and receives BF responder frames on coarse sectors.

15. The apparatus of any preceding embodiment: (a) wherein said wireless communication apparatus performs a multiple-hop communication network protocol for directional transmission in the PHY layer of said multiple-hop communication network protocol; (b) wherein said wireless communication apparatus performs a multiple-hop communication network protocol for directional transmission for a station operating in a mode selected from a group of station type modes consisting of source station, destination station, intermediate (hop) station, mesh access point, client station, mesh station, portal station, multiple input multiple output station, and single input single output station; and (c) wherein said wireless communication apparatus is configured for operating in a network containing any desired combination of mesh and non-mesh stations.

16. An apparatus for wireless communication with directional transmission, comprising: (a) a wireless communication circuit configured for wirelessly communicating with other wireless communication stations; (b) wherein said wireless communication circuit is configured with directional transmission having a plurality of antenna pattern sectors each having different transmission directions; (c) a processor coupled to said wireless communication circuit; (d) a non-transitory memory storing instructions executable by the processor; and (e) wherein said instructions, when executed by the processor, perform steps comprising: performing adaptive neighbor discovery in a mesh network, in which partial BF training and early termination of BF training and mesh network discovery are decided together with allocating flexible time for alternate transmission and reception of simultaneous BF training and mesh network discovery frames.

17. The apparatus of any preceding embodiment, wherein said instructions when executed by the processor further perform steps comprising: performing simultaneous BF training and scanning for mesh network discovery, in which frames are swept through antenna pattern sectors and contain information about mesh network ID and mesh network capabilities in addition to BF training frame information including directional operation parameters and sector sweep information.

18. The apparatus of any preceding embodiment, wherein said instructions when executed by the processor further perform steps comprising: receiving joint network entry and BF training frames by mesh STAs which then transmit response frames that include sector sweep responder information and mesh network configuration.

19. The apparatus of any preceding embodiment, wherein said instructions when executed by the processor further perform steps comprising: performing fine transmit BF training and coarse receive BF training in a single phase, in which a mesh STA with directional transmission sweeps BF training frames across fine sectors in a transmission period and receives BF responder frames on coarse sectors.

20. The apparatus of any preceding embodiment: (a) wherein said wireless communication apparatus performs a multiple-hop communication network protocol for directional transmission in the PHY layer of said multiple-hop communication network protocol; (b) wherein said wireless communication apparatus performs a multiple-hop communication network protocol for directional transmission for a station operating in a mode selected from a group of station type modes consisting of source station, destination station, intermediate (hop) station, mesh access point, client station, mesh station, portal station, multiple input multiple output station, and single input single output station; and (c) wherein said wireless communication apparatus is configured for operating in a network containing any desired combination of mesh and non-mesh stations.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for wireless communication with directional transmission, comprising:
   (a) a wireless communication circuit configured for wirelessly communicating with other wireless communication stations utilizing directional transmission having a plurality of antenna pattern sectors each having different transmission directions;
   (b) a processor coupled to said wireless communication circuit;
   (c) a non-transitory memory storing instructions executable by the processor; and
   (d) wherein said instructions, when executed by the processor, perform one or more steps comprising:
      (i) performing simultaneous beamform (BF) training and scanning for a network or a neighbor station, in which transmitting frames are swept through antenna pattern sectors;
      (ii) wherein the transmitting frames contain information about network ID and network capabilities in addition to BF training frame information including directional operation parameters and sector sweep information; and
      (iii) wherein said wireless communication circuit operating as a new node attempting to join the network sweeps a discovery signal to jointly discover and initiate BF training with neighbors in an existing network.

2. The apparatus as recited in claim 1, wherein said wireless communication apparatus performs a multiple-hop communication network protocol for directional transmission in the PHY layer of said multiple-hop communication network protocol.

3. The apparatus as recited in claim 1, wherein said wireless communication apparatus performs a multiple-hop communication network protocol for directional transmission for a station operating in a mode selected from a group of station type modes consisting of source station, destination station, intermediate (hop) station, mesh access point, client station, mesh station, portal station, multiple input multiple output station, and single input single output station.

4. The apparatus as recited in claim 1, wherein said wireless communication apparatus is configured for operating in a network containing any desired combination of mesh and non-mesh stations.

5. The apparatus as recited in claim 1, wherein said wireless communication circuit is configured for transmitting and receiving on millimeter wave frequencies.

6. The apparatus as recited in claim 1, wherein said instructions when executed by the processor further perform one or more steps comprising:
  (i) performing beamforming (BF) training in a one-shot transmit and receive sector sweeping by generating BF training transmissions within a BF training transmission interval, and following the BF training transmission interval with a BF training reception interval in which BF training reception is performed; and
  (ii) wherein said antenna pattern sectors for BF training transmissions comprise fine array pattern sectors, with multiple sectors from these fine array pattern sectors being separately grouped in a sector grouping mechanism to group IDs, wherein the collection of groups comprises coarse array pattern sectors are utilized during BF training reception.

7. The apparatus as recited in claim 6, wherein said instructions when executed by the processor further perform one or more steps comprising signaling said group ID in every frame during simultaneous beamform (BF) training and scanning for a network.

8. The apparatus as recited in claim 7, wherein said instructions when executed by the processor further perform one or more steps comprising processing of the group ID by a neighbor station which maps this group ID into a transmission slot, with the neighbor station accessing the channel and completing BF training together with responding to mesh discovery during this transmission slot.

9. The apparatus as recited in claim 1, wherein said instructions when executed by the processor further perform one or more steps comprising halting and then later resuming said simultaneous beamform (BF) training and scanning to avoid latencies in delivering data packets.

10. The apparatus as recited in claim 1, wherein said instructions when executed by the processor further perform one or more steps comprising performing said simultaneous beamform (BF) training and scanning with flexible mesh discovery transmission and reception times in which a portion of the sector directions are swept followed by a reception period, after which another portion of the sector directions are swept followed by a reception period.

11. An apparatus for wireless communication with directional transmission, comprising:

(a) a wireless communication circuit configured for wirelessly communicating with other wireless communication stations;
(b) wherein said wireless communication circuit is configured with directional transmission having a plurality of antenna pattern sectors each having different transmission directions;
(c) a processor coupled to said wireless communication circuit;
(d) a non-transitory memory storing instructions executable by the processor; and
(e) wherein said instructions, when executed by the processor, perform one or more steps comprising:
  (i) performing beamforming (BF) training in a one-shot transmit and receive sector sweeping by generating BF training transmissions within a BF training transmission interval, and following the BF training transmission interval with a BF training reception interval in which BF training reception is performed; and
  (ii) wherein said antenna pattern sectors for BF training transmissions comprise fine array pattern sectors, with multiple sectors from these fine array pattern sectors being separately grouped in a sector grouping mechanism to group IDs, wherein the collection of groups comprises coarse array pattern sectors are utilized during BF training reception.

12. The apparatus as recited in claim 11, wherein said instructions when executed by the processor further perform one or more steps comprising: receiving joint network entry and BF training frames by mesh STAs which transmit response frames that comprise sector sweep responder information and mesh network configuration.

13. The apparatus as recited in claim 11, wherein said instructions when executed by the processor further perform one or more steps comprising: performing an adaptive neighbor discovery scheme in which partial BF training and early termination of BF training and mesh network discovery are decided together with allocating flexible time for alternate transmission and reception of simultaneous BF training and mesh network discovery frames.

14. The apparatus as recited in claim 11, wherein said instructions when executed by the processor further perform one or more steps comprising: performing fine transmit BF training and coarse receive BF training in a single phase, whereby a mesh STA with directional transmission sweeps BF training frames across fine sectors in a transmission period and receives BF responder frames on coarse sectors.

15. The apparatus as recited in claim 11:
wherein said wireless communication apparatus performs a multiple-hop communication network protocol for directional transmission in the PHY layer of said multiple-hop communication network protocol;
wherein said wireless communication apparatus performs a multiple-hop communication network protocol for directional transmission for a station operating in a mode selected from a group of station type modes consisting of source station, destination station, intermediate (hop) station, mesh access point, client station, mesh station, portal station, multiple input multiple output station, and single input single output station; and
wherein said wireless communication apparatus is configured for operating in a network containing any desired combination of mesh and non-mesh stations.

16. The apparatus as recited in claim 11, wherein said instructions when executed by the processor further perform one or more steps comprising performing a joint BF training and mesh discovery in which simultaneous BF training and scanning is performed for mesh network discovery, whereby frames are swept through antenna pattern sectors and contain information about mesh network ID and mesh network capabilities in addition to BF training frame information including directional operation parameters and sector sweep information.

17. The apparatus as recited in claim 16, wherein said instructions when executed by the processor further perform one or more steps comprising signaling said group ID in every frame during joint BF training and mesh discovery.

18. The apparatus as recited in claim 17, wherein said instructions when executed by the processor further perform one or more steps comprising processing the group ID by a neighbor station which maps this group ID into a transmission slot, with the neighbor station accessing the channel and completing BF training together with responding to mesh discovery during this transmission slot.

19. The apparatus as recited in claim 16, wherein said instructions when executed by the processor further perform one or more steps comprising halting and then later resuming said simultaneous beamform (BF) training and scanning toward avoiding latencies in delivering data packets.

20. The apparatus as recited in claim 16, wherein said instructions when executed by the processor further perform one or more steps comprising performing said simultaneous beamform (BF) training and scanning with flexible mesh discovery transmission and reception times in which a portion of the sector directions are swept followed by a reception period, after which another portion of the sector directions are swept followed by a reception period.

* * * * *